US011270285B2

(12) United States Patent
Bishop et al.

(10) Patent No.: US 11,270,285 B2
(45) Date of Patent: Mar. 8, 2022

(54) FUEL PRE-PURCHASING AND SHARING SYSTEM AND ASSOCIATED METHODS

(71) Applicant: Z Energy Limited, Wellington (NZ)

(72) Inventors: Scott K. Bishop, Auckland (NZ); Cody Iddings, Auckland (NZ)

(73) Assignee: Z Energy Limited, Wellington (NZ)

( * ) Notice: Subject to any disclaimer, the term of this patent is extended or adjusted under 35 U.S.C. 154(b) by 137 days.

(21) Appl. No.: 16/416,130

(22) Filed: May 17, 2019

(65) Prior Publication Data

US 2020/0364691 A1    Nov. 19, 2020

(51) Int. Cl.
*G06Q 20/28* (2012.01)
*G06F 9/54* (2006.01)
*G06Q 20/20* (2012.01)

(52) U.S. Cl.
CPC ............ *G06Q 20/28* (2013.01); *G06F 9/542* (2013.01); *G06Q 20/201* (2013.01); *G06Q 20/204* (2013.01)

(58) Field of Classification Search
CPC .... G06Q 20/28; G06Q 20/201; G06Q 20/204; G06F 9/542
See application file for complete search history.

(56) References Cited

U.S. PATENT DOCUMENTS

| | | | |
|---|---|---|---|
| 6,073,840 A * | 6/2000 | Marion | B67D 7/067 235/381 |
| 6,145,741 A | 11/2000 | Wisdom et al. | |
| 8,185,449 B2 | 5/2012 | Ward | |
| 2002/0029171 A1 | 3/2002 | Senior | |
| 2005/0049981 A1 * | 3/2005 | Mixon | G06Q 30/06 705/400 |
| 2008/0195432 A1 | 8/2008 | Fell et al. | |
| 2008/0195486 A1 | 8/2008 | Sopinsky et al. | |
| 2008/0195497 A1 * | 8/2008 | Holme | G06Q 20/202 705/17 |
| 2009/0070254 A1 | 3/2009 | Thrush | |

(Continued)

FOREIGN PATENT DOCUMENTS

| | | |
|---|---|---|
| CA | 2931475 | 11/2017 |
| EP | 2343680 | 7/2011 |

OTHER PUBLICATIONS

International Search Report and Written Opinion received for counterpart International Patent Application No. PCT/NZ2019/050085, dated Nov. 8, 2019, 17 pages.

(Continued)

*Primary Examiner* — Vanel Frenel
(74) *Attorney, Agent, or Firm* — Perkins Coie LLP

(57) ABSTRACT

A fuel pre-purchasing and sharing system (and associated methods) is disclosed herein. The system allows consumers to pre-purchase fuel at a pre-purchased price, and redeem pre-purchased fuel at a subsequent time regardless of the current price of fuel posted at the point of re-fueling. The pre-purchased price can be based on current fuel prices of fuel at one or more service stations that are near to a consumer at the time that the fuel is pre-purchased. Pre-purchased fuel of one or more grades of fuel can be held in a pre-purchased fuel tank. The pre-purchased fuel tank can be shared with other consumers such that the other consumers can redeem pre-purchased fuel held in the pre-purchased fuel tank.

21 Claims, 9 Drawing Sheets

(56) References Cited

U.S. PATENT DOCUMENTS

| | | | | |
|---|---|---|---|---|
| 2009/0307098 A1* | 12/2009 | Verona | ................... | G06Q 20/10 |
| | | | | 705/17 |
| 2013/0124347 A1 | 5/2013 | Hwang | | |
| 2013/0198074 A1 | 8/2013 | Cox et al. | | |
| 2013/0346158 A1 | 12/2013 | Wolf et al. | | |
| 2014/0244413 A1* | 8/2014 | Senior | ................... | G06Q 30/06 |
| | | | | 705/20 |
| 2017/0345106 A1 | 11/2017 | Shimonov | | |
| 2017/0363432 A1* | 12/2017 | Hall | ........................ | B67D 7/04 |
| 2019/0005762 A1 | 1/2019 | Racusin | | |

OTHER PUBLICATIONS

"7-Eleven Fuel App: Lock in Our Best Local Fuel Price", [retrieved from internet on Nov. 5, 2019. <URL: https://web.archive.org/web/20190228003042/https://www.7eleven.com.au/fuel-app>; published on Feb. 28, 2019 as per Wayback Machine.

* cited by examiner

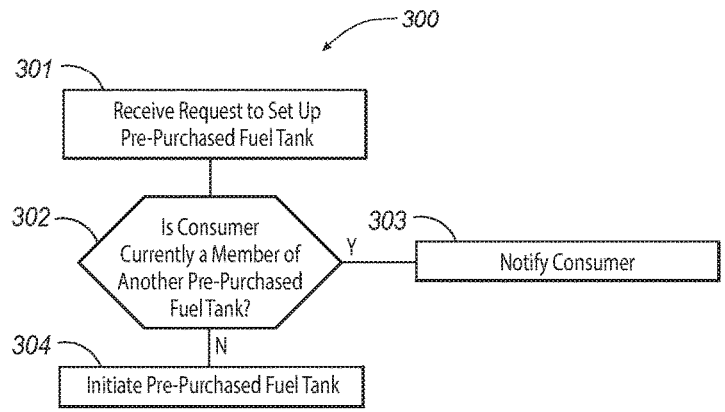
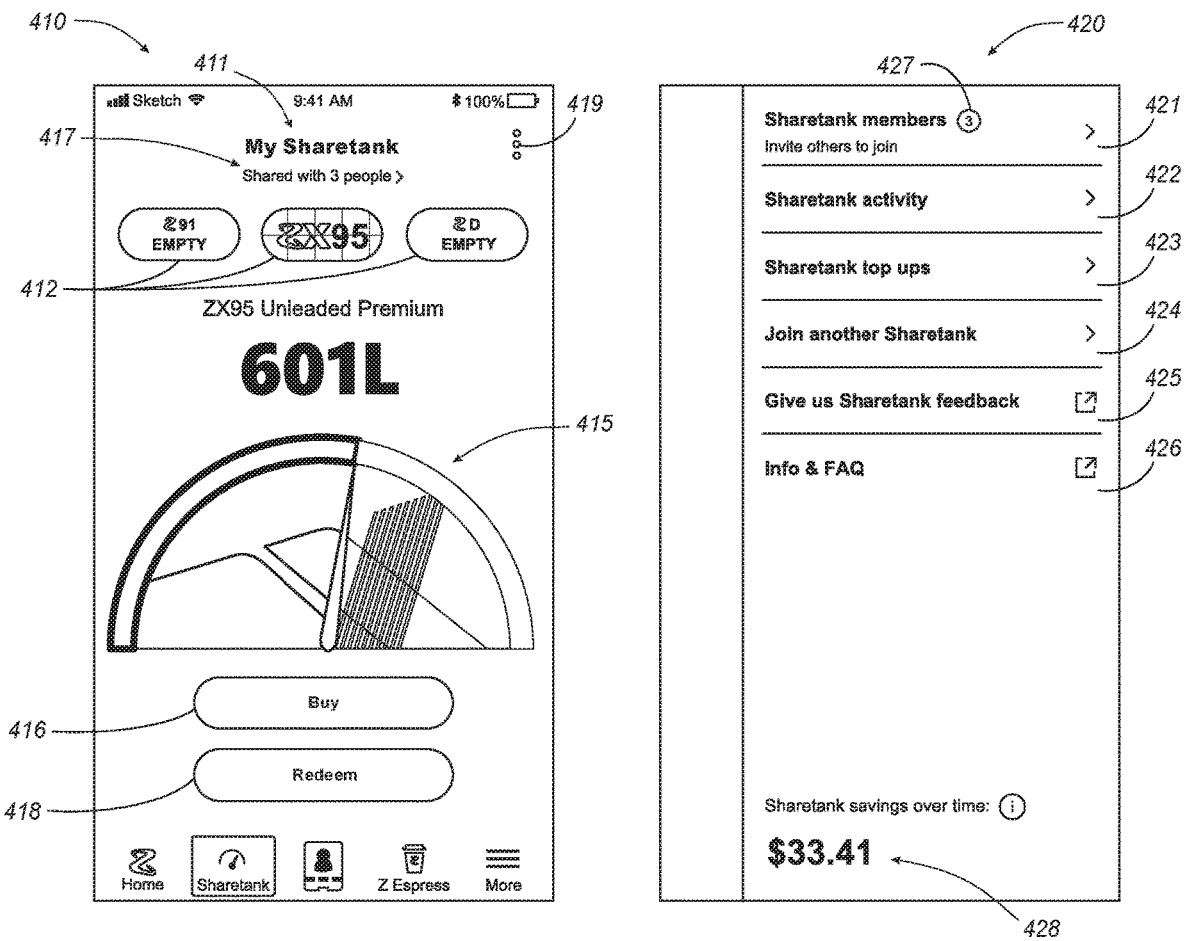
Fig. 3
Fig. 4A    Fig. 4B

FUEL PRE-PURCHASING AND SHARING SYSTEM AND ASSOCIATED METHODS

BACKGROUND

Retail fuel prices can be extremely volatile as a result of changing production costs, variable markups, amount of competition, and impact of regulations and government taxes, among other factors. For example, retail fuel prices are primarily determined by the cost of drilling, well completion, refining, distributing, and marketing oil and gas. In addition, service stations typically add a markup per litre to make a profit. In some regions, these markups are regulated such that service stations are prohibited from charging less than a certain percentage over invoice from a wholesaler (e.g., to protect small, individually-owned service stations in these regions). Furthermore, government taxes in some geographical regions are typically added to the price per litre, and the taxes can vary from one region to another. As a result, retail fuel prices can vary at points of sale across even the same geographical region, especially as any one or more of the costs, markups, regulations, and/or government taxes change.

Volatility and disparity in fuel prices often affects consumer behavior. For example, when fuel prices are high, consumers tend to drive less and buy vehicles with greater fuel economies. In addition, to save money, many consumers will drive large distances to top up at service stations that sell fuel at cheaper prices per litre, even though fuel spent driving to these service stations eats into and diminishes the savings realized by topping up at those locations. In addition to driving consumer purchasing behavior, the variability of fuel prices also impacts the ability of consumers and businesses to accurately budget for fuel purchases in a given period. In the presence of volatile fuel prices, individuals and small business are unable to accurately budget for their monthly (much less their yearly) fuel expenditure.

BRIEF DESCRIPTION OF THE DRAWINGS

Many aspects of the present disclosure can be better understood with reference to the following drawings. Emphasis is placed on illustrating clearly the principles of the present disclosure. Thus, the drawings should not be taken to limit the disclosure to the specific embodiments depicted, but are for explanation and understanding only.

FIG. 3 is a flow diagram illustrating a routine for setting up a pre-purchased fuel tank.

FIGS. 4A and 4B illustrate representative interfaces of a pre-purchased fuel tank.

DETAILED DESCRIPTION

Figure 1:
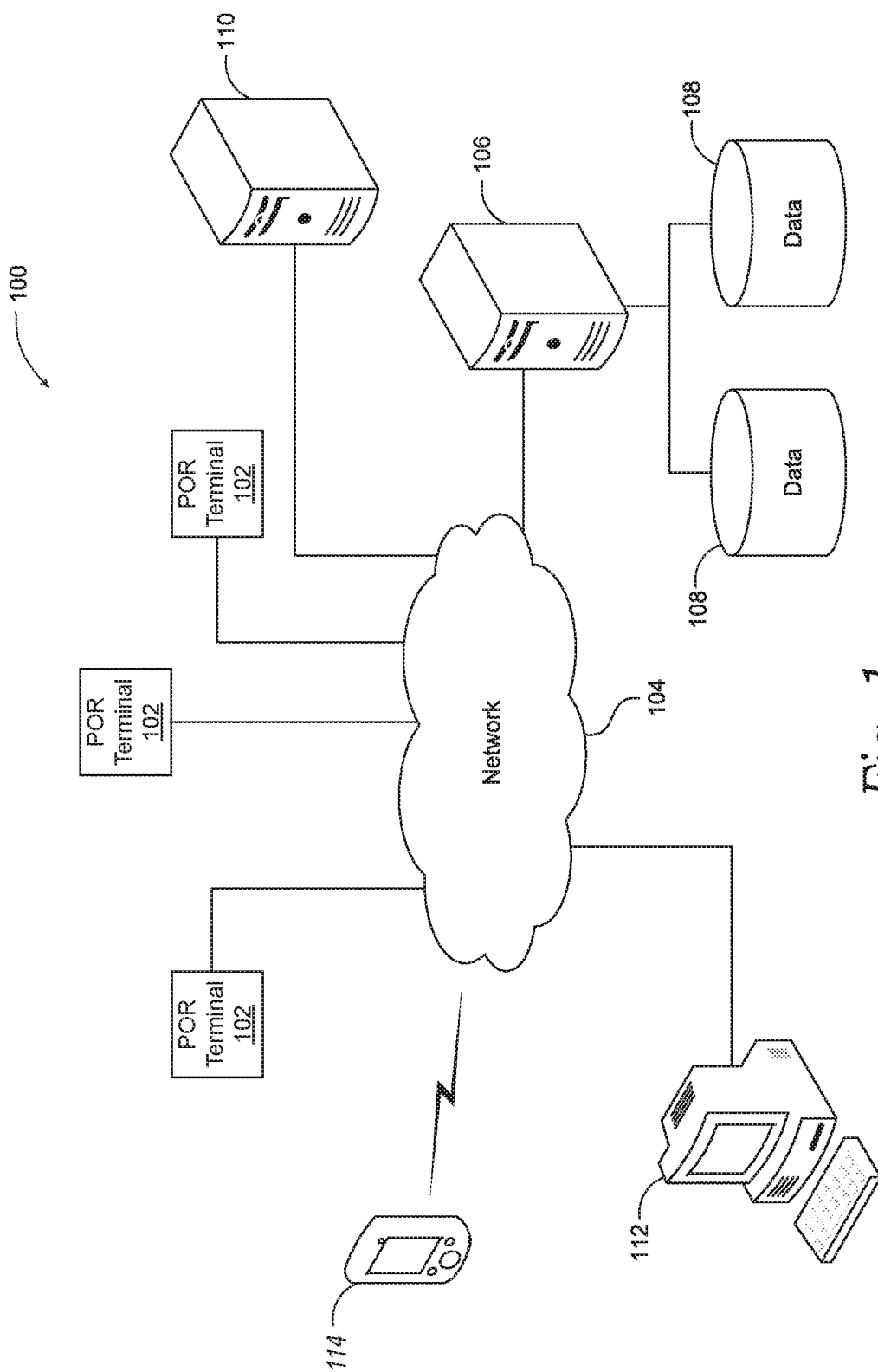
FIG. 1 is a block diagram of a representative environment in which a fuel pre-purchasing and sharing system operates.

As discussed in greater detail below, the technology disclosed herein relates to a fuel pre-purchasing and sharing system (and associated methods) that can be used by an individual or business consumer to pre-purchase a specified amount of fuel at a fuel price available at nearby service stations at a time the fuel prices are retrieved. In some embodiments, the pre-purchase price of fuel offered by the system is the lowest price of fuel at fueling stations within a certain geographic area surrounding the consumer. At a later date, the consumer may redeem pre-purchased fuel at the pre-purchased price regardless of the current price of fuel posted at a service station or other fueling point. If the current price of fuel is less than the pre-purchased price of fuel, the consumer may elect to purchase fuel at the current price rather than utilize the pre-purchased fuel.

The system allows the pre-purchased fuel "tank" to be shared with other consumers such that the other consumers can redeem pre-purchased fuel held in the pre-purchased fuel tank. The system allows the tank administrator to place certain rules on the sharing and consumption of the pre-purchased fuel by the other consumers. Additionally, the system allows one or more grades of fuel to be held in a pre-purchased fuel tank.

In this manner, the fuel pre-purchasing and sharing system offers several advantages to consumers. For example, the system enables consumers to pre-purchase fuel at times when fuel prices are low and/or in anticipation of an increase in fuel prices, and enables consumers to redeem pre-purchased fuel at times when the current prices of fuel are higher than the cost of the pre-purchased fuel. In addition, by offering consumers the ability to pre-purchase fuel at competitive prices (e.g., the lowest prices available at nearby service stations), consumer conduct of driving longer distances to fill up at service stations offering the best fuel prices is lessened and/or obviated. Furthermore, because consumers are able to pre-purchase fuel in bulk, consumers are able to accurately budget for their fuel expenditure despite otherwise volatile fuel prices and/or unlock free litres of fuel through their bulk purchases. Additionally, business consumers are able to better manage their fuel expenses by hedging against potential fuel price swings, and to consolidate their tax reporting enabling them to deduct their business-related fuel expenditures.

The fuel pre-purchasing and sharing system also offers several benefits to a fuel seller. In embodiments where pre-purchased fuel can only be redeemed at specific service stations and/or vendors, consumers who pre-purchase fuel are more likely to purchase fuel from the specific service stations and/or vendors, thereby capturing a greater percentage of those consumers' business and building brand loyalty. The fuel pre-purchasing and sharing system also enables consumers to share these benefits with other consumers, including friends, family, coworkers, employees, and/or others, which may entice new consumers to try the fuel seller's services.

Various embodiments of the technology will now be described. The following description provides specific details for a thorough understanding and an enabling description of these embodiments. Some well-known structures or functions may not be shown or described in detail, so as to avoid unnecessarily obscuring the relevant description of the various embodiments. A person skilled in the art, however, will understand that the technology may have additional embodiments and that the technology may be practiced without several of the details of the embodiments described below with reference to FIGS. 1-10. The terminology used in the description presented below is intended to be interpreted in its broadest reasonable manner, even though it is being used in conjunction with a detailed description of certain specific embodiments of the invention.

As used herein, the term "fuel" refers to any liquid or gaseous material that is periodically purchased for purposes of powering a vehicle. The terms "grade of fuel," "fuel grade," and the like are used herein to refer to types and/or ratings of fuel. Although the terms "fuel," "grades of fuel," "fuel grade," and the like are primarily used in the context of petrol/gasoline having various octane levels in the discussion below, these terms are not so limited. In some embodiments, one or more of these terms can refer to one or more of the following: diesel fuel, bio-diesel, hydrogen, ethanol, liquefied petroleum gas (LPG), natural gas (e.g., methane, carbon dioxide, nitrogen, hydrogen sulfide, and/or helium), and/or another type of fuel.

FIG. 1 is a block diagram of a representative environment 100 in which a fuel pre-purchasing and sharing system configured in accordance with various embodiments of the present technology operates. As shown, the environment includes several components, including point of redemption (POR) terminals 102, personal computers or laptops 112, mobile devices 114 (e.g., mobile phones, tablets, etc.), servers 106 and associated data storage areas 108, and payment and/or redemption processors 110. The components of the environment 100 are connected to and communicate through one or more networks 104. Networks 104 may be any type of public or private, wired or wireless, network connection suitable for transporting data between nodes. In some embodiments, the Internet is one of the networks used to provide connectivity, but other networks may also be used. For example, the systems could be connected through dedicated landlines or through a terrestrial or satellite wireless network.

As will be described in additional detail herein, consumers are able to utilize computers 112 and/or mobile devices 114 to pre-purchase fuel from a fuel seller. To pre-purchase fuel, the consumer utilizes an application or accesses a website on a computer or mobile device. The consumer determines how much fuel that they want to purchase at the offered price. When a purchase is made, information about the consumer and the pre-purchased fuel is maintained by one or more servers 106. The servers 106 may be operated by the fuel seller, or may be operated by other parties on behalf of the fuel seller. The servers 106 store collected information about the consumer and the pre-purchased fuel in a data storage area 108. Data storage area 108 may be any computer readable medium that can be read or written to by servers 108, such as RAID arrays, cloud storage, network storage, solid state storage drives, etc. In some embodiments, collected information that is stored in the data storage area 108 can be indexed (e.g., according to consumer, according to pre-purchased fuel tanks, and/or according to another indexing method).

After pre-purchasing fuel, the system allows consumers to utilize the pre-purchased fuel when filling at a refueling station operated by the fuel seller. Aspects of the filling process are tracked by POR terminals 102 that are located at refueling sites. These refueling sites may include individually-owned service stations, franchised service stations, co-op or group operated fuel distribution facilities, port facilities such as marinas and airports, or any other location where fuel may be used to refill fuel-driven vehicles such as motorcycles, automobiles, trucks, boats, planes, etc. Each POR terminal 102 maintains or can access information about fueling transactions, including current fuel prices and the amount of fuel distributed. The POR terminal 102 also maintains and/or accesses information to allow the consumer to be charged for distributed fuel. For example, the POR terminal 102 may allow payment information to be provided by the consumer, and/or for the consumer or the consumer's vehicle to provide information identifying the consumers' pre-purchased fuel tank to allow the distributed fuel to be debited against the pre-purchased fuel tank. As will be described in additional detail below, it will be appreciated that POR terminal functionality may be incorporated into one or more physical systems at a fueling site. For example, the POR terminal functionality may be incorporated into a fuel pump itself, distributed between a fuel pump and a cash register or sales terminal, distributed between a pump and mobile application, etc. POR functionality may be incorporated at least in part into one or more other systems.

Information collected at the POR terminals 102 can be transmitted to various components in environment 100 via the network 104. For example, POR terminals 102 can communicate transaction information and validate payment information with the payment and/or redemption processors 110. The collected information can be sent from a POR terminal 102 to the various components as a single message. Alternatively, the collected information can be aggregated at the POR terminals 102 and periodically (e.g., hourly, daily, etc.) transmitted to the various components. In some embodiments, the servers 106 and/or other components of the environment 100 can correlate collected information from different sources using, for example, dates and times indicated in the collected information.

The fuel pre-purchasing and sharing system uses tracked information to monitor pre-purchased fuel balances and/or pre-purchased fuel tank sharing, to calculate savings that consumers achieved by pre-purchasing fuel, and/or to perform other tasks. The system then generates one or more reports that consumers may use to retrieve information about their activities and/or the pre-purchased fuel tanks to which they are associated. In some embodiments, the system makes the reports available to consumers via an application or website. Consumers may access the web site or application using the personal computers or laptops 112 and/or the mobile devices 114. Consumers may also access reports through other means, such as at an outdoor fueling pump, at a payment register, and/or through a hard copy provided by the system.

Figure 2:
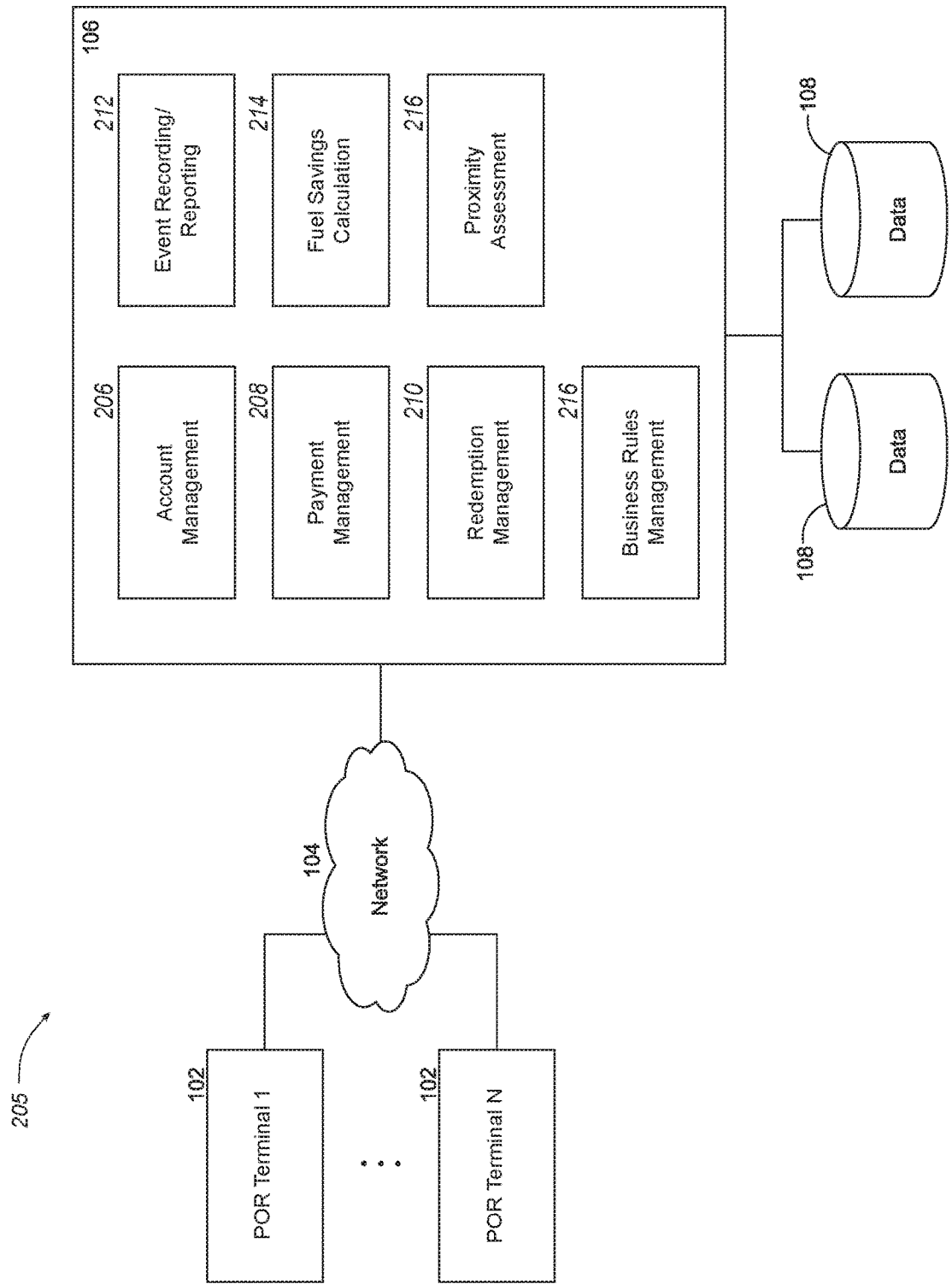
FIG. 2 is a block diagram of a fuel pre-purchasing and sharing system.

FIG. 2 is a block diagram of some of the functional modules that are utilized by a fuel pre-purchasing and sharing system 205 configured in accordance with various embodiments of the present technology. As shown, the system 205 includes a set of N POR terminals 102, either standalone or (wholly or partially) integrated into fuel pumps, that are connected to a server 106. The POR terminals 102 are located at service stations and/or at other locations where fuel is delivered to consumers. The POR terminals 102 transmit information to the server 106 through a network 104. For example, the POR terminals 102 in some embodiments transmit amounts of fuel pumped, payment information, and other identifiers and/or codes that may be used to uniquely identify a consumer. In some embodiments, the POR terminals may include biometric sensors to collect biometric information (e.g., images of a consumer, fingerprints of a consumer, etc.) that can be used to correlate the consumer with a pre-purchased fuel tank associated with that consumer. In some embodiments, data from the POR terminals may be supplemented with data from one or more video cameras or other sensors that are used to capture vehicle identifiers associated with vehicles that are being refilled. For example, cameras that are operational at a fueling station may captures images of license plates in order to identify a consumer's vehicle. As another example, sensors at a fueling station may detect a radio-frequency identifier or other beacon that is associated with a consumer's vehicle in order to identify the vehicle. Although POR terminals 102 are shown separately, data collection can be aggregated from two or more POR terminals 102 before transmission to the server 106.

The server 106 interfaces with data storage areas 108 that are configured to store various information collected by the POR terminals 102 and/or generated or maintained by the system 205. For example, the data storage areas 108 can store consumer account and/or pre-purchased fuel tank information, unique identifiers and/or codes that identify each consumer, vehicle information, service station information (e.g., address, current fuel prices, vendor, owner, etc.), transaction (e.g., redemption) information, and/or other information. As a specific example, the POR terminals 102 can synchronously or asynchronously send current fuel prices to the server 106 via the network 104, and servers 106 can update a database of current fuel prices stored in the data storage area 108.

As described in greater detail below, the one or more servers 106 includes a number of modules for implementing the functionality described herein. For example, the one or more servers can include an account management module 206, a payment management module 208, a redemption management module 210, an event recording/reporting module 212, a fuel savings calculation module 214, a proximity assessment module 216, a business rules management module 218, and/or one or more other modules. Modules are used to facilitate various fuel pre-purchasing and redemption functions of the system 205. For example, one or more modules can be used to facilitate setting up a pre-purchased fuel tank (described in greater detail below with respect to FIG. 3); recording and/or reporting events related to the pre-purchased fuel tank and/or other information (described in greater detail below with respect to FIGS. 3-9); pre-purchasing fuel (described in greater detail below with respect to FIG. 5); sharing a pre-purchased fuel tank (described in greater detail below with respect to FIGS. 6-8); and/or redeeming pre-purchased fuel (described in greater detail below with respect to FIG. 9). The server 106 may have other standard modules that are not shown. For example, certain communication, display, and web interface modules may be present but are not depicted for purposes of clarity.

The account management module 206 handles account setup and management for consumers wishing to pre-purchase fuel. A consumer who has not previously registered with the system 205 may be required to register and create an account with the system 205 to use its features. When registering, the consumer creates a consumer identifier (e.g., a username and password) for the system and provides other account information, such as credit card information or a bank account identifier to allow the system 205 to execute fuel pre-purchases associated with the account. The consumer may also provide vehicle information to allow the system 205 to link fuel redemption transactions to the account. For example, the consumer may provide one or more vehicle identifiers, such as the make, model, and/or license plate of a vehicle or vehicles that will be tracked by the system 205. In some embodiments, the system 205 can retrieve vehicle information from a government database based on a vehicle identifier (e.g., a license plate number, a VIN number, etc.) provided by the consumer. The account management module 206 receives the consumer information and stores it in the data storage area 108. The account management module 206 provides other functionality relating to consumer accounts, including enabling a consumer to (a) pre-purchase and/or redeem fuel, (b) share a pre-purchased fuel tank, (c) add and/or remove members from the pre-purchased fuel tank, (d) set account settings, rules, and guidelines, and/or (e) perform other functions.

The proximity assessment module 216 identifies a location of the consumer at the time of fuel pre-purchase. As will be described in additional detail herein, the price of fuel available for pre-purchase is determined in part by the location of the consumer. The proximity assessment module 216 identifies the location of the consumer from address information that was provided by the consumer in a registration process, from position information reported by the consumer's mobile device or estimated from IP address information of the consumer's devices used to access the system, by historical purchase information associated with the consumer, or by other location determination technologies. Using the location of the consumer, the proximity assessment module 216 is able to identify one or more fueling stations that fall within a certain geographic proximity of the consumer by calculation of a straight-line distance between the consumer's position and each of the locations of the fueling stations. Fueling stations of one or more brands or vendors that fall within a certain geographic distance are utilized to set pricing information for pre-purchased fuel.

The payment management module 208 facilitates purchase of fuel, whether as a pre-purchased tank or on-demand at a time of filling. For example, the payment management module 208 can be configured to retrieve current fuel prices from one or more service stations, determine various metrics of the retrieved fuel prices (e.g., the lowest, average, and/or highest current fuel price) by grade, perform transaction calculations, and/or charge accounts. In some embodiments, the payment management module 208 can provide other functionality relating to pre-purchasing or redeeming fuel, including fuel account balancing of pre-purchased fuel tanks, preauthorization, and/or retrieval and execution of consumer pre-purchasing preferences.

The redemption management module 210 facilitates redemption of pre-purchased fuel amounts. That is, the redemption management module 210 tracks a tank amount of fuel of a fuel grade in a consumer's pre-purchased fuel tank, and decrements the tank amount when fuel is pumped at a fueling station. In some embodiments, the redemption management module 210 can generate transaction codes, validate transaction codes, unlock fuel pumps, and/or pre-authorize transactions. In these and still other embodiments, the redemption management module 210 can compare current fuel prices to one or more carrying costs and/or perform other fuel redemption functions, such as fuel account balancing.

The business rules management module 218 stores and facilitates execution of one or more business rules defined by the fuel pre-purchasing and sharing system 205 and/or by consumers who use the system 205. For example, the system 205 can set a limit on a number of members that can be associated with a pre-purchased fuel tank at one time, which the business rules management module 218 can store and implement. As another example, the business rules management module 218 can store and implement limits set by an administrator and/or the system 250 on the amount of fuel (in litres, in dollars, or a combination thereof) that may be pre-purchased or redeemed (e.g., per transaction, within a specified time period, etc.) or stored in the pre-purchased fuel tank (e.g., per fuel grade, per fuel tank, etc.). In some embodiments, consumers who use the system 205 can set automatic top off rules that are stored and executed at least in part by the business rules management module 218. For example, the business rules management module 218 can automatically re-fill a consumer's pre-purchased fuel tank by a specified amount (in litres, in dollars, etc.) authorized by the consumer whenever a current price of a fuel grade reaches or drops below a threshold dollar amount per litre specified by the consumer and/or whenever the balance of a fuel grade in a pre-purchased fuel tank reaches or drops below a threshold amount of fuel specified by the consumer.

The event recording/reporting module 212 facilitates recording and reporting of system events. Every transaction associated with a consumer is recorded by the event recording/reporting module 212, whether additions to a fuel tank (e.g., top up transactions), sharing of a fuel tank, or distributions from a fuel tank (e.g., redemption transactions). The event recording/reporting module 212 can also send various system notifications, including error notifications, invitations to join a pre-purchased fuel tank, requests to join a pre-purchased fuel tank, and/or member removal notifications. In some embodiments, the event recording/reporting module 212 stores notification and/or transaction data for subsequent manipulation and display. For example, the event recording/reporting module 212 can format and display information to a consumer who uses the system 205.

The fuel savings calculation module 214 utilizes stored information to calculate savings achieved by pre-purchasing fuel and/or redeeming pre-purchased fuel. For example, the fuel savings calculation module 214 can calculate savings by multiplying an amount of fuel redeemed in a transaction by a difference between (i) a current fuel price at the service station from which the fuel was redeemed and (ii) the cost (e.g., average cost, lowest cost, highest cost, etc.) of the pre-purchased fuel. As another example, the fuel savings calculation module 214 can calculate savings by multiplying an amount of fuel pre-purchased in a transaction by a difference between (i) a pre-purchase price presented to a consumer by the system 205 (e.g., the lowest current fuel price offered by service stations nearby the consumer) and (ii) another metric of the current fuel prices offered by the service stations nearby the consumer (e.g., the average current fuel price, the highest current fuel price, the current fuel price of the closest service station(s) to the consumer, etc.). In these and still other embodiments, the fuel savings calculation module 214 can calculate savings using other methods, such as using historical and/or projected data of fuel prices.

Although the various modules are depicted in server 106, the modules are not necessarily co-located. In some embodiments, the various modules could be distributed over multiple physical devices and the functionality implemented by the modules may be provided by calls to remote services. Moreover, multiple servers may be used to implement various functions of the system 205 described herein. Similarly, the data storage areas 108 can be local storage or remote storage, and/or can be distributed in one or more physical devices. The code to support the functionality of the system 205 may be stored on a computer-readable medium such as an optical drive, flash memory, hard drive, or other storage device.

FIG. 3 is a flow diagram illustrating a routine 300 executed by the system for setting up a pre-purchased fuel tank configured in accordance with various embodiments of the present technology. The routine 300 is executed, at least in part, by various components of a fuel pre-purchasing and sharing system. For example, all or a subset of one or more of the steps of the routine 300 can be carried out by the account management module, the payment management module, the event recording/reporting module, the business rules management module, and/or one or more other modules of the fuel pre-purchasing and sharing system.

At block 301, the routine receives a request to set up a pre-purchased fuel tank. In some embodiments, the request can be received from a consumer who does not currently have an account associated with the fuel pre-purchasing and sharing system. In other embodiments, the request can be received from a consumer who currently has an account associated with the system and/or who is currently or was previously an administrator or a member of another pre-purchased fuel tank. The request can be a request to set up a personal and/or a commercial pre-purchased fuel tank.

In some embodiments, the request to set up a pre-purchased fuel tank can include information relating to the consumer. For example, the request can include a name, a username, an email address, a home address, a phone number, demographic information, and/or other information (e.g., vehicle information and/or other consumer identifiers) of the consumer. If not currently stored by the system, the request can include payment information (e.g., credit card, bank account, rewards program information, etc.) associated with the consumer. In some embodiments, the request can include a vehicle identifier (e.g., license plate number) associated with the consumer. As described in greater detail below, the vehicle identifier can be identified at one or more service stations and used to link fuel transactions to the consumer and/or to a pre-purchased fuel tank. In some embodiments, the vehicle identifier can be used to retrieve (e.g., from a government database) make and model information of a vehicle associated with the vehicle identifier that in turn can be used to determine average fuel tank size, average fuel economy, and/or other information upon which the fuel pre-purchasing and sharing system can use to calculate savings achieved by pre-purchasing and/or redeeming fuel.

At decision block 302, the routine 300 determines whether the consumer is currently an administrator of a pre-purchased fuel tank or member of another pre-purchased fuel tank. For purposes of this description, an administrator is a consumer that purchases and manages the sharing of a pre-purchased fuel tank. In contrast, a member is a consumer that has been granted permission by an administrator to use fuel in a shared fuel tank. In other embodiments, the routine 300 determines whether the consumer is currently a member or administrator of (i) another personal pre-purchased fuel tank if the request received at block 301 is a request to set up a personal pre-purchased fuel tank and/or (ii) another commercial pre-purchased fuel tank if the request received at block 301 is a request to set up a commercial pre-purchased fuel tank.

If the routine 300 determines that the consumer is currently a member or administrator of another personal and/or commercial pre-purchased fuel tank, the routine 300 proceeds to block 303 to notify the consumer. The consumer is notified if the system is configured to limit an account to only a single pre-purchased fuel tank at a time (e.g., a single pre-purchased fuel tank per account (whether personal or commercial), one personal pre-purchased fuel tank and one commercial pre-purchased fuel tank per account, or another number of personal and/or commercial pre-purchased fuel tanks per account). Thus, if the consumer is currently an administrator and/or member of one or more other pre-purchased fuel tanks and the administrator has reached the limit of pre-purchased fuel tanks allowed by the fuel pre-purchasing and sharing system, the routine 300 can notify the consumer that he/she has reached the limit of pre-purchased fuel tanks allowed and/or can instruct the consumer to close out and/or leave a pre-purchased fuel tank before setting up another pre-purchased fuel tank. In other embodiments in which the system allows a consumer to maintain multiple pre-purchased fuel tanks, the notification in block 303 may require the consumer to assign a new name or select a new type of fuel tank before proceeding to block 304.

If the routine determines that the consumer is not currently a member or administrator of another personal and/or commercial pre-purchased fuel tank at decision block 302, processing proceeds to block 304. At block 304, the routine 300 sets up or initiates a pre-purchased fuel tank. Initiating a pre-purchased fuel tank typically involves three steps. First, an identifier or code is used to uniquely identify the fuel tank. As described in greater detail below, the unique identifier can be used to share the pre-purchased fuel tank with other members and/or to redeem fuel from the pre-purchased fuel tank. Second, the consumer or a designated party identified by the consumer is assigned as an administrator of the pre-purchased fuel tank. As will be described herein, an administrator can control whether the fuel tank is shared with other consumers, and if shared, may define one or more rules that specify conditions under which the fuel is shared. Finally, an amount of fuel is associated with the fuel tank. As will be described herein, one or more grades of fuel (e.g., regular unleaded, high octane unleaded, grade of diesel, etc.) and an amount of each fuel grade are associated with the fuel tank. The price of the fuel that is added to the fuel tank may be determined using a lowest cost of fuel in a geographic area surrounding the consumer. In some embodiments, a sign-up bonus amount of fuel (e.g., 10 litres) may be automatically added to the fuel tank by the system operator as an incentive for the consumer to utilize the fuel pre-purchasing and sharing system on a trial basis.

Although the steps of the routine 300 are discussed and illustrated in a particular order, the method illustrated by the routine 300 in FIG. 3 is not so limited. In other embodiments, the method can be performed in a different order. For example, any of the steps of the routine 300 can be performed before, during, and/or after any of the other steps of the routine 300. Moreover, a person of ordinary skill in the relevant art will readily recognize that the illustrated method can be altered and still remain within some embodiments of the present technology. For example, one or more steps of the routine 300 illustrated in FIG. 3 can be omitted and/or repeated in some embodiments.

FIGS. 4A and 4B illustrate representative user interfaces 410 and 420, respectively, of an application generated by the system that allows consumers to access and utilize a pre-purchased fuel tank configured in accordance with various embodiments of the present technology. In particular, FIG. 4A illustrates a home page interface 410 that reflects status of a pre-purchased fuel tank, and FIG. 4B illustrates a menu page interface 420 that allows a consumer to implement certain functions associated with the pre-purchased fuel tank.

FIG. 4A reflects an interface that is generated by the system and which would be presented to an administrator of a pre-purchased fuel tank. The home page interface 410 includes a name 411 of the pre-purchased fuel tank, such as "My Sharetank." In other embodiments, the home page interface 410 can be a home page interface 410 of a member of a pre-purchased fuel tank. In these embodiments, the name 411 of the pre-purchased fuel tank can indicate the name of an administrator of the pre-purchased fuel tank (e.g., "John's Sharetank").

The home page interface 410 further includes one or more fuel grade indicators 412. The fuel grade indicators 412 indicate the grade of fuel that is contained in the pre-purchased fuel tank. Selecting the button corresponding to the fuel grade causes the display to change to reflect the amount of that fuel grade currently remaining in the tank. If the pre-purchased fuel tank contains a zero balance of that grade of fuel, the corresponding button may indicate that the tank is empty using text (e.g., "empty"), color (e.g., the button color red for empty), or another visual identifier. In some embodiments, the home page interface 410 can depict only fuel grade indicators 412 corresponding to fuel grades an administrator or member can pre-purchase or redeem.

By selecting a fuel grade indicator 412, an administrator or member changes one or more graphics presented on the home page interface 410. For example, the fuel grade indicator 412 corresponding to "ZX95" is selected in the home page interface 410 illustrated in FIG. 4A. Selecting the button causes a corresponding fuel grade ("ZX95 Unleaded Premium"), and account fuel balance ("601 L" or 601 litres) in the pre-purchased fuel tank to be displayed. In addition to the textual representation of fuel balance, a graphic 415 of the account fuel balance in the form of a fuel gauge may also be displayed. The graphic 415 provides a representation of the account fuel balance 414 of the corresponding fuel grade 413 in comparison to a zero balance and a maximum fuel account balance permitted in the pre-purchased fuel tank.

In some embodiments, the home page interface 410 can include a "Buy or Top Up" button 416. The button 416 can be displayed on the home page interface 410 at all times or only when an administrator or member is permitted to pre-purchase fuel. When a consumer selects button 416, the system sends a request to buy or top up (i.e., pre-purchase more fuel) of the displayed fuel grade. The request initiates a routine for topping up the pre-purchased fuel tank, which is described in greater detail below with respect to FIG. 5.

In some embodiments, the home page interface 410 can include a "Redeem" button 418. The button 418 can be displayed on the home page interface 410 at all times or only when an administrator or member is permitted to redeem pre-purchased fuel. By selecting button 418, an administrator or member sends a request to redeem pre-purchased fuel of a selected fuel grade (i.e., a fuel grade corresponding to a selected fuel grade indicator 412). The request initiates a routine for redeeming pre-purchased fuel from the pre-purchased fuel tank, which is described in greater detail below with respect to FIG. 9.

As discussed above, a pre-purchased fuel tank can be shared with one or more other members. In some embodiments, the home page interface 410 can include a representation 417 of the number of consumers sharing the pre-purchased fuel tank (including or excluding the consumer of the home page interface 410). By selecting the representation 417, a consumer can view various information (e.g., the names and usage history) of the consumers sharing the pre-purchased fuel tank. Various routines for sharing a pre-purchased fuel tank are described in greater detail below with respect to FIGS. 6-8.

In some embodiments, the home page interface 410 can include other indicators, buttons, graphics, and/or representations in addition to or in lieu of the indicators, buttons, graphics, and/or representations illustrated in FIG. 4A and/or described above. For example, the home page interface 410 can include icons for interfacing with one or more other applications or features, and/or the home page interface 410 can include a menu icon 419 for accessing a menu page interface 420 (FIG. 4B) of a pre-purchased fuel tank.

Referring to FIG. 4B, the menu page interface 420 includes various menu options and/or other graphics or representations related to a pre-purchased fuel tank. For example, the menu page interface 420 can include a manage members menu option 421 ("Sharetank members"). By selecting the manage members menu option 421, a consumer can view various information (e.g., names, username, contact info, usage history, etc.) of administrators and/or members of a pre-purchased fuel tank. The manage members menu option 421 can include a representation 427 indicating the number of members (including or excluding the administrator) sharing the pre-purchased fuel tank. In some embodiments, by selecting the manage members menu option 421 an administrator and/or a member (if authorized) can invite other consumers to join the pre-purchased fuel tank and/or can remove members from and/or leave a pre-purchased fuel tank. The system may apply certain rules to limit the total number of consumers that share a pre-purchased fuel tank, for example limiting a shared tank to five total members. The system may also apply certain rules to limit the frequency that a member can join or leave a particular shared tank. Various routines corresponding to these functions are described in greater detail below with respect to FIGS. 6 and 8. In these and still other embodiments, by selecting the manage members menu option 421, a consumer can edit his/her account or profile settings (e.g., username, email address, password, vehicle information, phone number, preferences, rules, guidelines, preapprovals, and/or other account settings or information).

The menu page interface 420 includes an activity menu option 422 ("Sharetank activity"). By selecting the activity menu option 422, an administrator and/or a member (if authorized) can view a log of various actions performed by the fuel pre-purchasing and sharing system and/or by the administrator and/or members of a pre-purchased fuel tank. For example, the activity menu option 422 can permit an administrator and/or a member (if authorized) to view various notifications, requests, top up transactions, and/or redemption transactions related to the pre-purchased fuel tank. In these and still other embodiments, the activity menu option 422 can allow an administrator and/or a member (if authorized) to set rules, guidelines, and/or preapprovals related to use of pre-purchased fuel.

In some embodiments, the menu page interface 420 can include a top-up menu option 423 to view a record of all top-ups for a particular shared tank ("Sharetank top ups"). By selecting the pre-purchase fuel menu option 423, an administrator and/or a member (if authorized) can view a record of all pre-purchased fuel, including the date, amount, and price of pre-purchased fuel. In some embodiments, the pre-purchased fuel menu option 423 can allow an administrator to set one or more member permissions (e.g., which members can pre-purchase fuel, member limits on pre-purchasing fuel, etc.).

The menu page interface 420 can include a join another pre-purchased fuel tank menu option 424 ("Join another Sharetank"). By selecting the join another pre-purchased fuel tank menu option 424, the system initiates a routine to allow the administrator and/or member to join a different pre-purchased fuel tank (described in greater detail below with respect to FIG. 7).

Several tools are also provided on the menu page interface 420 to facilitate use of the application. For example, the menu page interface 420 can include a feedback menu option 425 ("Give us Sharetank feedback") and/or an info and frequently asked questions menu option 426 ("Info & FAQ"). By selecting the feedback menu option 425, an administrator and/or a member can provide feedback related to the fuel pre-purchasing and sharing system. By selecting the info and FAQ menu option 426, an administrator and/or a member can access various information and/or legal documents related to the fuel pre-purchasing and sharing system, such as information about how the system works, specific terms of service, privacy policy, and/or copyright/trademark/patent notifications.

In these and still other embodiments, the menu page interface 420 can include a savings representation 428. As discussed above and in greater detail below, the savings representation 428 indicates savings that the administrator or member has achieved by pre-purchasing fuel and/or redeeming pre-purchased fuel. The savings representation 428 can represent an aggregate savings achieved by all members of a pre-purchased fuel tank and/or by only the consumer of the menu page interface 420. In some embodiments, the savings representation 428 can represent savings achieved over a particular period of time (e.g., since the pre-purchased fuel tank was set up, over the past week, over the past month, over the past year, etc.). Although the savings representation 428 is illustrated in dollars saved over time in FIG. 4B, the savings representation 428 can be depicted in one or more other representations (e.g., driven kilometers saved by pre-purchasing fuel via the fuel pre-purchasing and sharing system rather than driving to the service station offering the cheapest current fuel price, a number of fuel tanks that is equivalent to the dollars saved using a current fuel price, bonus litres or other rewards earned, etc.).

Figure 5:
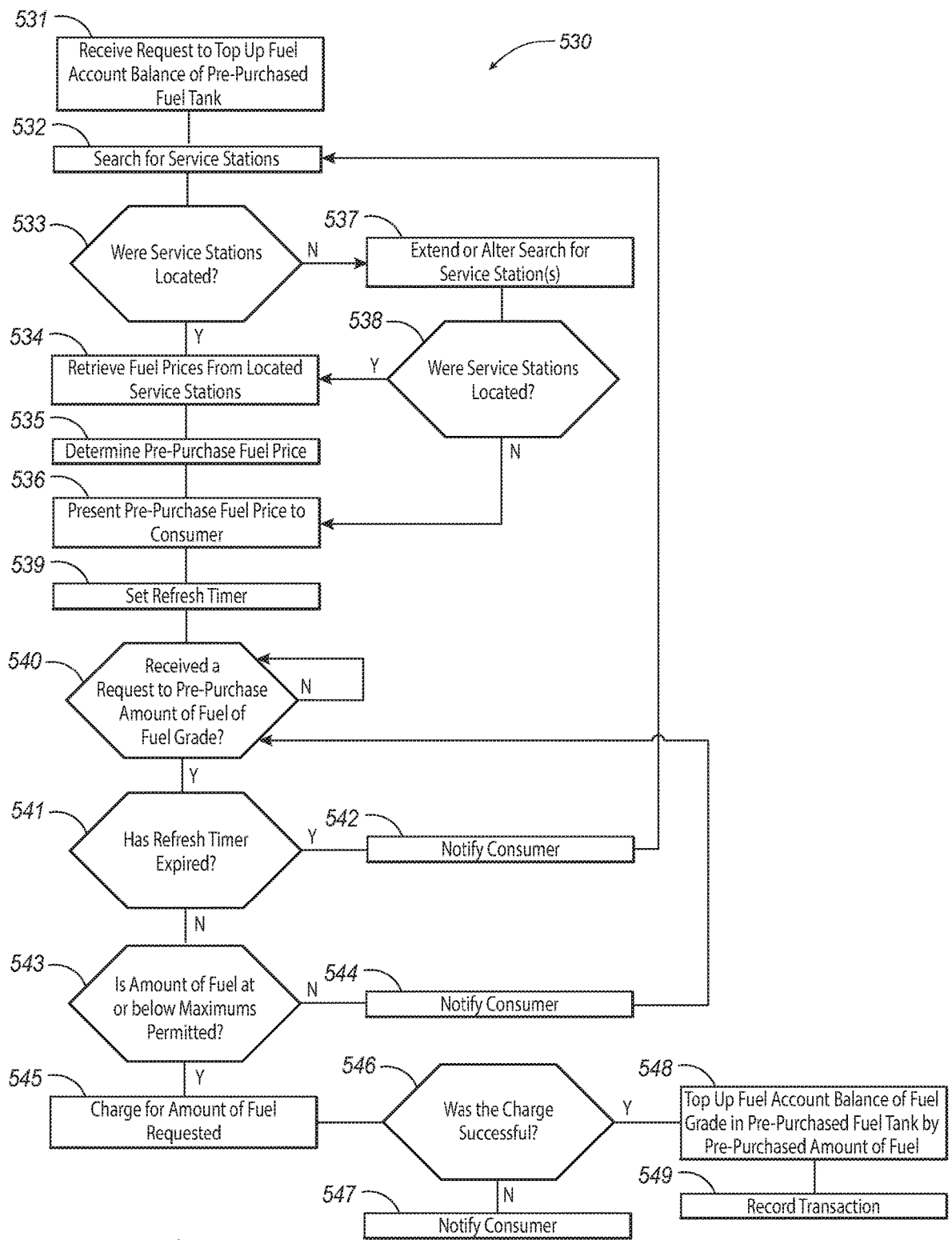
FIG. 5 is a flow diagram illustrating a routine for topping up a pre-purchased fuel tank.

FIG. 5 is a flow diagram illustrating a routine 530 executed by the system for topping up a pre-purchased fuel tank configured in accordance with various embodiments of the present technology. All or a subset of one or more of the steps of the routine 530 can be carried out by the account management module, the payment management module, the event recording/reporting module, the fuel savings calculation module, the proximity assessment module, the business rules management module, and/or one or more other modules of the fuel pre-purchasing and sharing system.

The routine 530 begins at block 531 by receiving a request to top up a fuel account balance of a pre-purchased fuel tank. In some embodiments, only an administrator of a pre-purchased fuel tank can top up the pre-purchased fuel tank. In other embodiments, other consumers in addition to or in lieu of an administrator of a pre-purchased fuel tank can top up a pre-purchased fuel tank. For example, the routine 530 can receive a request to top up a balance of a pre-purchased fuel tank from one or more members that share a pre-purchased fuel tank. As another example, the routine 530 can receive a request to top up a fuel account balance of a pre-purchased fuel tank from one or more consumers not associated with the pre-purchased fuel tank (e.g., from consumers who wish to donate to a pre-purchased fuel tank of a charity organization or from consumers who want to contribute to a pre-purchased fuel tank of a friend or family member). In some embodiments, the routine 530 can receive a request to top up a fuel account balance of a pre-purchased fuel tank via an application (e.g., on a consumer's mobile phone), via a website, via a kiosk at a service station or retail location, and/or via another interface of the fuel pre-purchasing and sharing system. Requests to top-up a fuel tank may specify a fuel grade to top up the pre-purchased fuel tank (e.g., if no grade is currently associated with the fuel tank).

At block 532, the routine 530 searches for service stations that are within a certain geographic proximity of the consumer. The routine 530 searches for service stations in accordance with one or more rules or guidelines established by the fuel pre-purchasing and sharing system. For example, the rules can be based on a search radius from the consumer's current location (e.g., 5 km, 10 km, 20 km, 30 km, 50 km, 100 km, or another distance). In some embodiments, the radius is a straight-line distance from the consumer's current location. In other embodiments, the radius is based on a driving distance from the consumer's current location using the network of roads surrounding the consumer. The radius set by the system can be based on any number of factors, such as average commuter distance, average size of geographical regions, average spacing between service stations, etc. In these embodiments, the routine 530 can retrieve the consumer's current location by determining the current location of the consumer's mobile phone (e.g., using the GPS coordinates of the mobile phone) or computing device (e.g., estimated using the IP address of the computing device). Using the current location, the routine 530 searches for service stations within the search radius from the current location. Identified servicer stations that fall within the search radius are then used by the system to set the price at which fuel may be pre-purchased.

In some embodiments, the center of the search radius can be based on a location other than the consumer's current location. For example, the search radius can be instead computed from (i) a mobile phone or computing device of a specified administrator or a specified member of a pre-purchased fuel tank other than the consumer, (ii) the consumer's residence location, (iii) a specified administrator's or member's residence location, or (iv) an address of a place of business. In some embodiments, the center of the search radius can be based on a location that is frequently utilized by the consumer. For example, the search location can be based on one or more service stations (e.g., a "home" station) frequently used by the consumer or by a specified administrator or member. Alternatively, rather than basing the search area on a radius, the routine 530 can instead search for service stations within a current, registered, or frequently visited zip code or other defined geographical region (e.g., county) of the consumer or of a specified administrator or member of the pre-purchased fuel tank.

In some embodiments, when searching for service stations that fall within the search radius, the system may exclude certain service stations from the search based on certain criteria. For example, the system may exclude service stations of a particular vendor or brand, service stations that do not offer a desired fuel grade, service stations that are currently closed to the general public, service stations that are truck stops, etc. In some embodiments, the routine 530 can also limit the search to service stations matching search criteria (e.g., service stations offering certain fuel grades, service stations associated with a particular rewards program, etc.) specified by the consumer, by an administrator, or by another member of the pre-purchased fuel tank.

At decision block 533, the routine 530 determines whether the routine 530 located service stations that satisfied the search criteria at block 532. If the routine 530 determines that service stations were located in the search performed at block 532, the routine 530 proceeds to block 534 to retrieve fuel prices of the located service stations. Otherwise, the routine 530 proceeds to block 535.

At block 534, the routine 530 retrieves fuel prices from the located service stations. As discussed above, the fuel pre-purchasing and sharing system maintains a database in which current fuel prices at one or more service stations are synchronously or asynchronously updated and stored. Alternatively, or additionally, in some embodiments the system can transmit pricing queries to service stations and receive current pricing information in response to those queries. The routine 530 queries the database for the current fuel prices at the service stations that satisfied the search criteria. The routine 530 can retrieve current fuel prices of all fuel grades offered by the identified service station(s). Alternatively, the routine 530 can retrieve current fuel prices of only specific fuel grades sought to be pre-purchased.

At block 535, the routine 530 determines a pre-purchase fuel price based on the fuel prices retrieved at block 534. In some embodiments, the routine selects the lowest current fuel price from those service stations satisfying the search criteria. In other embodiments, the routine 530 can calculate a blended rate to the fuel prices retrieved at block 534. For example, the routine 530 determines an average (e.g., mean, median, mode, weighted average, etc.) price, selects the second-lowest price (throwing out the lowest price), or applies another selection methodology to the current fuel prices offered by the service stations located at block 532.

At block 536, the routine 530 presents the pre-purchased fuel price to the consumer. For example, the routine 530 can present the consumer the lowest (e.g., minimum) fuel price of a specified fuel grade offered by the service stations located at block 532 as the pre-purchased fuel price. In some embodiments, the routine 530 can present the consumer the lowest (e.g., minimum) fuel price for each grade of fuel offered by the service stations located at block 532. The consumer is therefore able to better assess which fuel grade that they would like to pre-purchase. In some embodiments, the routine 530 can apply a discount to the displayed pre-purchase fuel price, where the discount is unique to the consumer and is based on the value of the consumer as a customer.

Returning again to decision block 533, if the routine 530 was not able to locate service stations in accordance with search criteria specified at block 532, the routine 530 proceeds to block 537 to extend and/or alter the search performed at block 532. For example, in embodiments where the routine 530 searches for service stations of a particular vendor within 30 km of the current location of the consumer's mobile device at block 532, the routine 530 at block 537 can extend the 30 km search radius until a threshold number of service stations are located. For example, the routine can extend the search radius to 50 km or another specified distance, or extend the search radius until a reasonable number (e.g., one, three, or more) service stations are located.

At block 538, the routine 530 determines whether the routine 530 was able to locate one or more service stations in accordance with the extended and/or altered search performed at block 537. If the routine 530 determines that the routine 530 was able to locate additional service stations at block 537, the routine 530 proceeds to blocks 534-536 to select and present a pre-purchase fuel price to the consumer.

On the other hand, if the routine 530 was unable to locate one or more service stations at block 537, the routine 530 proceeds to block 536 to present a default pre-purchase fuel price to the consumer. The default price is selected by the system, and could be an average lowest price across all service stations associated with the fuel distributor, a historical price previously offered to the consumer, or other price determined on historical or current fuel pricing data. Alternatively, the routine 530 can notify the consumer that no service stations were located and/or that topping up is currently unavailable.

At block 539, the routine 530 sets a refresh timer. As noted previously, fuel prices are volatile and can change frequently, even over the course of a few hours. As such, the routine 530 can set a refresh timer for a specific time period within which the fuel prices presented to the consumer at block 536 are valid. For example, the routine 530 can set a refresh timer for 5 min, 10 min, 20 min, 30 min, 60 min, 90 min, etc. The time period during which the fuel prices are still valid and available is measured from the time the routine 530 retrieves fuel prices from located service stations at block 534, from the time fuel prices are presented to the consumer at block 536, and/or from another event. In some embodiments, the routine 530 can set a refresh timer such that fuel prices presented to the consumer at block 536 remain valid for as long as the consumer remains engaged with an interface (e.g., a top up interface) of the fuel pre-purchasing and sharing system and/or for as long as one or more current fuel prices at the located service stations remain unchanged.

At block 540, the routine 530 checks to see if a request has been received to pre-purchase an amount of fuel at the price(s) presented to the consumer at block 536. The request can specify an amount of fuel to be purchased using different measures. For example, the request can contain the number of litres of fuel to purchase, a dollar amount of fuel to purchase, a number of fuel tank's worth of fuel to purchase (based on the tank size of a vehicle associated with the pre-purchased fuel tank), a time's worth of fuel to purchase based on an average consumption rate of the consumer (e.g., a week's, a month's, or a year's worth of fuel, etc.) of one or more grades of fuel the consumer would like to pre-purchase. Once a request to receive fuel is received at block 540, the routine 530 performs two checks to ensure that the fuel offer is available.

First, at block 541, the routine 530 determines whether the refresh timer has expired, that is, whether the amount of time defined at block 539 has elapsed before the routine 530 received the request to pre-purchase an amount of fuel at the presented fuel price. If the routine 530 determines that the refresh timer has expired, the routine 530 proceeds to block 542 to notify the consumer that the pricing is no longer valid and then returns to block 532 to identify new pricing to present to the consumer.

Second, at block 543, the routine 530 determines whether the requested amount of fuel exceeds a maximum purchase amount set by the fuel pre-purchasing and sharing system and/or by an administrator and/or member of the pre-purchased fuel tank. For example, the fuel pre-purchasing and sharing system or an administrator or member of the pre-purchased fuel tank can set a maximum amount of fuel (e.g., in litres) or money (e.g., in dollars) that can be pre-purchased in a single transaction and/or over a period of time (e.g., per week, month, year, etc.). In these embodiments, the routine 530 determines whether the requested amount of fuel conforms to these maximums. As another example, the fuel pre-purchasing and sharing system or an administrator or member of the pre-purchased fuel tank can set a maximum amount of fuel that can be stored in the pre-purchased fuel tank (e.g., across one or more grades of fuel). In these embodiments, the routine 530 determines whether a requested amount of fuel plus a current fuel account balance of a respective fuel grade in the pre-purchased fuel tank exceeds a maximum amount of fuel permitted in the pre-purchased fuel tank. If the routine 530 determines that the request to pre-purchase an amount of fuel exceeds the defined maximums, the routine 530 proceeds to block 544 to notify the consumer. Otherwise, the routine 530 proceeds to block 545 to charge the consumer for the requested amount of fuel.

At block 544, the routine 530 notifies the consumer that the requested amount of fuel exceeds one or more defined maximums. For example, the routine 530 can notify the consumer of the specific maximum that was exceeded and can instruct the consumer to reduce the requested amount of fuel to ensure that the purchase does not exceed the maximum. After providing notice to the consumer that the permitted maximum has been exceeded, the routine 530 returns to block 540 to await receipt of a new request to pre-purchase a different amount of fuel.

At block 545, the routine 530 charges the consumer for the requested amount of fuel. That is, the routine 530 multiplies the requested amount of fuel of a fuel grade by the pre-purchase fuel price of the fuel grade presented to the consumer and charges the consumer an amount equivalent to the resulting product. In some embodiments, the routine 530 uses account information stored by the fuel pre-purchasing and sharing system to charge an account associated with the consumer and/or associated with the pre-purchased fuel tank. In some embodiments, the routine 530 prompts the consumer for payment information and uses the payment information entered by the consumer to charge the consumer for the requested amount of fuel. In some embodiments, the consumer may be permitted to pay with (or earn) gift codes, reward points, airline miles, or other currency, which related information can be submitted in the payment information entered by the consumer. In these and still other embodiments, the routine 530 can authorize a charge for the requested amount of fuel by issuing a short-term (e.g., 7-day, 10-day, 30-day) loan to the consumer.

At block 546, the routine 530 determines whether the charge was successful. If the routine 530 determines that the charge was not successful, the routine 530 notifies the consumer that the charge was not successful (block 547) and returns to (a) block 545 to prompt the consumer for updated payment information, (b) block 540 to await a subsequent request to pre-purchase an amount of fuel, and/or (c) block 532 if the refresh timer set at block 539 has expired.

On the other hand, if the routine 530 determines that the charge was successful, the routine 530 proceeds to block 548 to top up the current fuel account balance of one or more respective fuel grades in the pre-purchased fuel tank. That is, the routine 530 increases a current fuel account balance of a fuel grade in the pre-purchased fuel tank by the amount of fuel of the fuel grade pre-purchased at block 545. In some embodiments, the routine 530 can also add an amount of bonus litres to the pre-purchased fuel tank to award the consumer for pre-purchasing a specified amount of fuel. It will be appreciated that an increase in the pre-purchased fuel tank does not involve any physical transfer of fuel or set-aside allocation of fuel to the consumer when the purchase is completed. Instead, the fuel tank is virtual and merely represents a redemption right of the consumer to a quantity of fuel in the future.

In some embodiments, the routine 530 can update a carrying cost of a fuel grade in the pre-purchased fuel tank when topping up the current fuel account balance of the fuel grade. For example, it is not unusual for the pre-purchased fuel tank to include fuel pre-purchased in multiple different transactions and at different prices. When multiple purchases are combined into a single fuel tank, the routine 530 can calculate an average (e.g., mean, median, mode, weighted, etc.) carrying cost of fuel in the pre-purchased fuel tank. As discussed in greater detail below, a calculated carrying cost can be used to determine whether it is a good time to pre-purchase fuel for and/or redeem fuel from the pre-purchased fuel tank. In some embodiments, the routine 530 can track amounts of fuel in the pre-purchased fuel tank that were pre-purchased at each fuel price.

At block 549, the routine 530 records the transaction executed at block 545. For example, the routine 530 can record amounts of fuel pre-purchased, transaction monetary amounts, price(s) per litre charged, bonus litres or other rewards earned, dates of the transaction, times of the transaction, information regarding the payment accounts charged, and/or the names and/or other information of the consumers. At the time of the purchase, the routine 530 can also calculate and record amounts saved by the purchase. For example, the routine 530 can calculate an amount saved by (a) determining the difference between the pre-purchase fuel price and an average fuel price, a highest fuel price, or another figure of the fuel prices retrieved at block 534 and (b) multiplying the difference by the pre-purchased amount of fuel in litres. In some embodiments, the routine 530 can record and track transaction details in one or more data tables, as discussed in greater detail below with respect to FIG. 10. In these and other embodiments, the consumer, an administrator, and/or another member of the pre-purchased fuel tank can (e.g., subsequently) review details of the recorded transaction.

Although the steps of the routine 530 are discussed and illustrated in a particular order, the method illustrated by the routine 530 in FIG. 5 is not so limited. In other embodiments, the method can be performed in a different order. For example, any of the steps of the routine 530 can be performed before, during, and/or after any of the other steps of the routine 530. Moreover, a person of ordinary skill in the relevant art will readily recognize that the illustrated method can be altered and still remain within some embodiments of the present technology. For example, one or more steps of the routine 530 illustrated in FIG. 5 can be omitted and/or repeated in some embodiments.

In some embodiments, all or a subset of the steps of the routine 530 can be used by the system to identify favorable pricing conditions and notify a consumer that it is a good time to pre-purchase fuel. For example, the routine 530 can (e.g., automatically and/or periodically) retrieve current fuel prices from service stations located in accordance with rules, guidelines, and/or search terms set by the system and/or by an administrator or member of a pre-purchased fuel tank. The routine 530 can compare the current fuel prices (e.g., the minimum current fuel price(s)) to historical and/or projected data of fuel prices, the carrying cost of fuel in the pre-purchased fuel tank, the lowest priced fuel in the pre-purchased fuel tank, the highest priced fuel in the pre-purchased fuel tank, and/or other data. If the routine 530 determines that current fuel prices are lower than the compared fuel price(s), the routine 530 can notify a consumer (e.g., an administrator and/or a member of the pre-purchased fuel tank) that it is a good time to pre-purchase fuel and/or prompt the consumer to pre-purchase fuel at the price presented. Similarly, in some embodiments, the routine 530 can notify a consumer that it is not a good time to pre-purchase fuel based on comparisons to past purchases and market conditions.

In these and still other embodiments, a consumer (e.g., an administrator and/or a member of the pre-purchased fuel tank) can set up the pre-purchased fuel tank to top up automatically in accordance with defined rules. For example, the routine 530 can be configured to automatically top up the pre-purchased fuel tank when the routine 530 determines that it is a good time to pre-purchase fuel and/or when fuel prices reach a (e.g., minimum or maximum) preapproved price per litre. In some embodiments, the routine 530 can automatically top up a pre-purchased fuel tank when a current fuel account balance of one or more fuel grades in the pre-purchased fuel tank drops below a minimum threshold limit. In these and still other embodiments, the routine 530 can be configured to automatically top up the pre-purchased fuel tank by a preapproved amount of fuel or money (e.g., when a minimum account balance threshold is reached, each week/month/year, etc.).

In some embodiments, a consumer can donate amounts of fuel to other consumers or organizations. For example, a consumer can pay to add fuel to a pre-purchased fuel tank associated with a charitable and/or public service organization. A consumer can also gift amounts of fuel to other consumers. For example, a consumer can pre-purchase an amount of fuel and transfer the future right of redemption of the pre-purchased amount of fuel to another consumer. Businesses (e.g., retail businesses, car rental companies, auto insurers, airlines companies, hotels, etc.) offer amounts of pre-purchased fuel to their customers as part of a loyalty program, as part of a sweepstakes or promotional program, as part of a bonus program for employees, etc. One way to offer such benefit is to issue codes that customers can enter to redeem fuel or increase their fuel balance of a fuel grade in a pre-purchased fuel tank.

Figure 6:
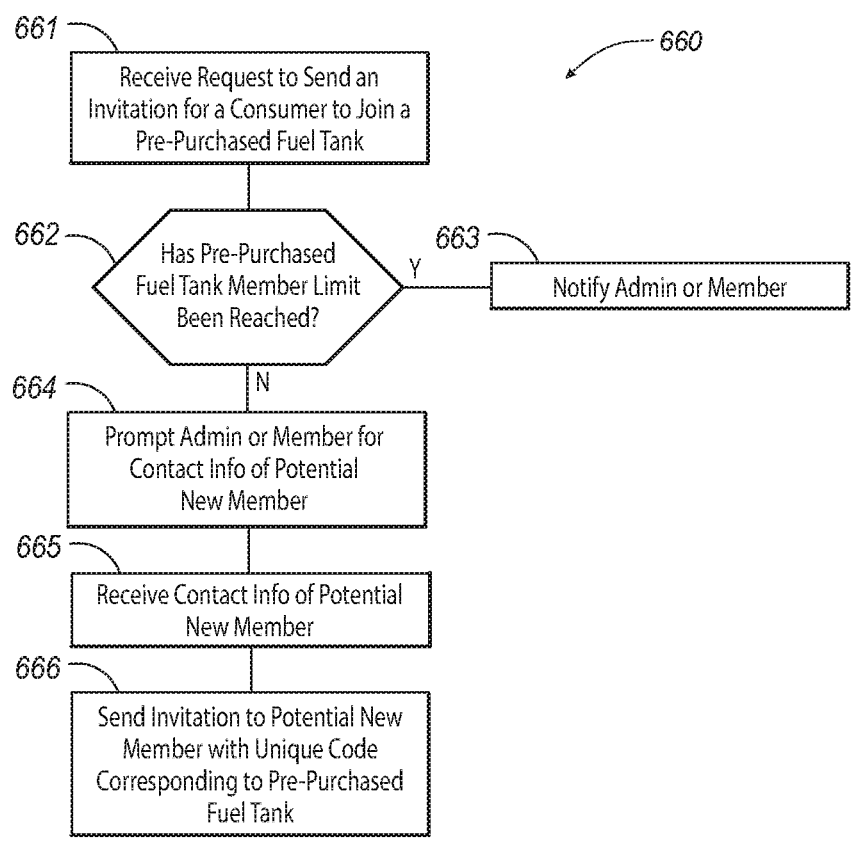
FIG. 6 is a flow diagram illustrating a routine for inviting a consumer to join a pre-purchased fuel tank.

FIG. 6 is a flow diagram illustrating a routine 660 executed by the system for inviting a consumer to join a pre-purchased fuel tank configured in accordance with various embodiments of the present technology. In some embodiments, the routine 660 can be executed, at least in part, by various components of a fuel pre-purchasing and sharing system. For example, all or a subset of one or more of the steps of the routine 660 can be carried out by the account management module, the event recording/reporting module, the business rules management module, and/or one or more other modules of the fuel pre-purchasing and sharing system. All or a subset of one or more steps of the routine 660 can be executed by an administrator or member of a pre-purchased fuel tank.

The routine 660 begins at block 661 by receiving a request from an administrator or a member of a pre-purchased fuel tank to send an invitation to a consumer to join as a member of the pre-purchased fuel tank. In some embodiments, only an administrator of a pre-purchased fuel tank can invite a consumer to join a pre-purchased fuel tank. In other embodiments, a member of a pre-purchased fuel tank can invite a consumer to join a pre-purchased fuel tank. In some embodiments, the routine 530 can receive a request to send an invitation to a consumer via an application (e.g., on a administrator's or member's mobile phone), via a website, via a kiosk at a service station or retail location, and/or via another interface of the system.

At block 662, the routine 660 determines whether a member limit for the pre-purchased fuel tank has been reached. For example, the fuel pre-purchasing and sharing system can set a limit on the number of members permitted per pre-purchased fuel tank (e.g., 4 members, 5 members, 8 members, 10 members, etc.). The limit of members per personal pre-purchased fuel tank can be the same or different than the limit of members per commercial pre-purchased fuel tank. In order to assess whether the member limit has been reached, the routine 660 compares the current number of members (including or not including the administrator) of the pre-purchased fuel tank to the limit of members permitted. If the routine 660 determines that the current number of members of the pre-purchased fuel tank exceeds the limit of members permitted, the routine 660 proceed to block 663 to notify the administrator or member. On the other hand, if the routine 660 determines that the current number of members of the pre-purchased fuel tank is less than or equal to the limit of members permitted, the routine 660 proceeds to block 664.

At block 663, the routine 660 notifies the administrator or member that the member limit of the pre-purchased fuel tank has been reached. For example, the routine 660 can notify the administrator or member that only a specified number of members are permitted per pre-purchased fuel tank. When the limit has been reached, the routine 660 can instruct the administrator or member to remove a member before a new invitation to join the pre-purchased fuel tank can be sent.

At block 664, the routine 660 can prompt the administrator or member for contact information of the potential new member if information about the potential new member is not already known by the system. For example, the routine 660 can prompt the administrator or member for an email address, username, account identifier, or phone number of the potential new member.

At block 665, the routine 660 receives the contact information of the potential new member. Alternatively, the contact information of the potential new member can be included in the request received by the routine 660 at block 661.

At block 666, the routine 660 sends an invitation to the potential new member using the contact information received at block 665. The invitation can include instructions or a link to instructions on how to register for and access the pre-purchased fuel tank. Alternatively, the routine 660 can populate a message field (e.g., of a text message or of an email) and provide invitation instructions, and the administrator or member can send the invitation to the potential new member. In some embodiments, the invitation can include a unique identifier or code associated with the pre-purchased fuel tank. As discussed in greater detail below, the potential new member can use the unique identifier to identify the pre-purchased fuel tank when he/she requests to join the pre-purchased fuel tank. In some embodiments, the unique identifier can remain unchanged for the life of the pre-purchased fuel tank such that the same unique identifier is sent in each invitation to join the pre-purchased fuel tank. In other embodiments, a new identifier can be generated and sent with each invitation to join the pre-purchased fuel tank such that an identifier is unique to each invitation to join.

In these and still other embodiments, the routine 660 can be restricted to sending invitations to join a pre-purchased fuel tank to only specific consumers. For example, in the case of a commercial pre-purchased fuel tank, the routine 660 can be restricted to sending an invitation to only consumers with the same email alias and/or who are registered in the same geographic region (e.g., zip code, address, etc.). As another example, in the case of a personal pre-purchased fuel tank, the routine 660 can be restricted to sending invitations to join the pre-purchased fuel tank to consumers sharing the same last name and/or who are registered in the same geographic region (e.g., zip code, address, etc.).

Although the steps of the routine 660 are discussed and illustrated in a particular order, the method illustrated by the routine 660 in FIG. 6 is not so limited. In other embodiments, the method can be performed in a different order. For example, any of the steps of the routine 660 can be performed before, during, and/or after any of the other steps of the routine 660. Moreover, a person of ordinary skill in the relevant art will readily recognize that the illustrated method can be altered and still remain within some embodiments of the present technology. For example, one or more steps of the routine 660 illustrated in FIG. 6 can be omitted and/or repeated in some embodiments.

Figure 7:
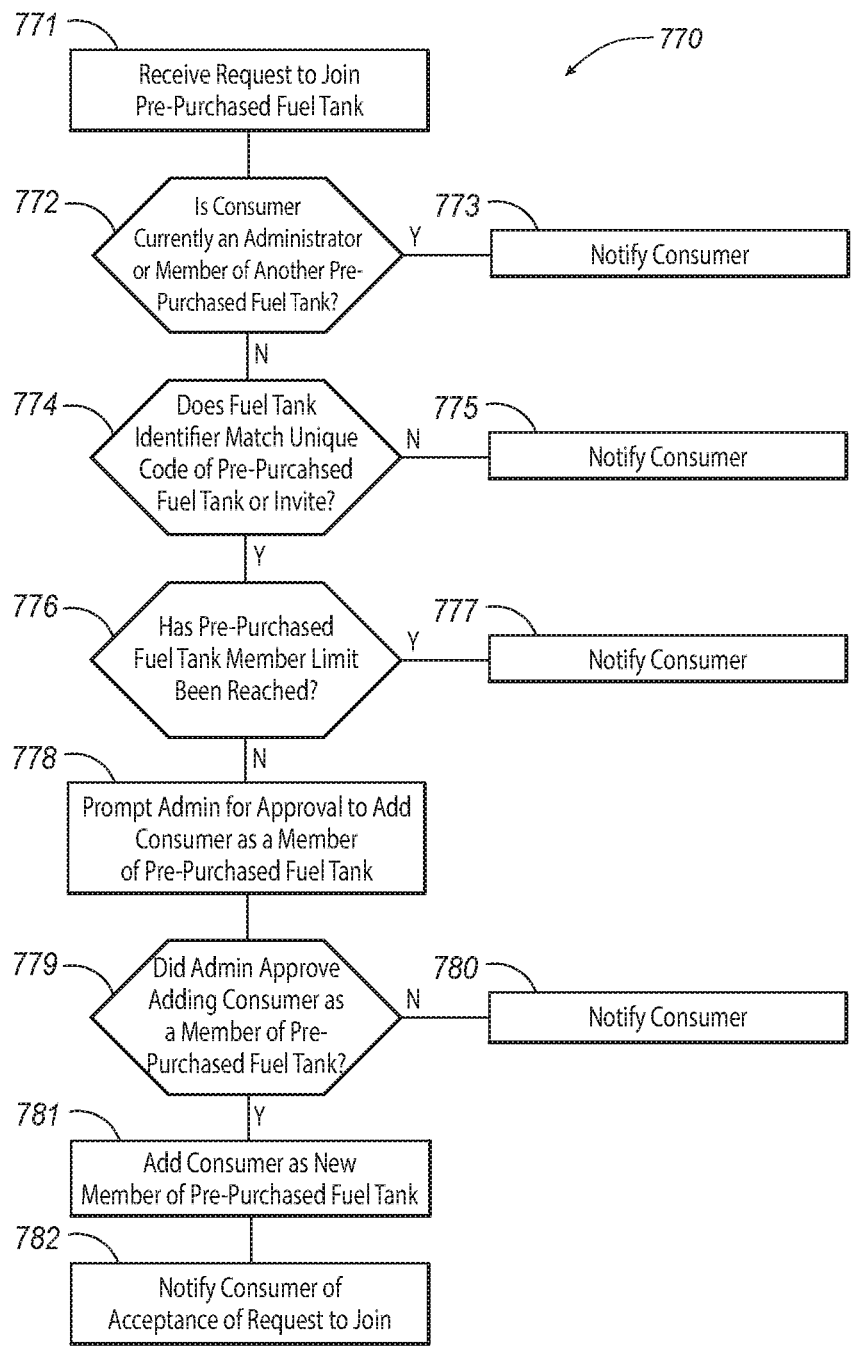
FIG. 7 is a flow diagram illustrating a routine for adding a member to a pre-purchased fuel tank.

FIG. 7 is a flow diagram illustrating a routine 770 executed by the system for adding a member to a pre-purchased fuel tank configured in accordance with various embodiments of the present technology. In some embodiments, the routine 770 can be executed, at least in part, by various components of a fuel pre-purchasing and sharing system. For example, all or a subset of one or more of the steps of the routine 770 can be carried out by the account management module, the event recording/reporting module, the business rules management module, and/or one or more other modules of the fuel pre-purchasing and sharing system.

The routine 770 begins at block 771 by receiving a request from a consumer to join a pre-purchased fuel tank. In some embodiments, the request can be received from a consumer who does not currently have an account associated with the fuel pre-purchasing and sharing system. In other embodiments, the request can be received from a consumer who currently has an account associated with the system and/or who is currently or was previously an administrator or a member of another pre-purchased fuel tank. In some embodiments, the request can include a unique identifier or code (e.g., sent to the consumer in an invitation to join a pre-purchased fuel tank) that can be used to identify a pre-purchased fuel tank that the consumer wishes to join.

In some embodiments, after receiving a request to join a pre-purchased fuel tank the routine 770 will query the consumer to obtain identifying information about the consumer, such as name, username, home address, email address, phone number, etc. Alternatively, the consumer's identifying information can be included in the request received by the routine 770 at block 771. Identifying information can include a name, a username, an email address, or a phone number of the consumer. In these and other embodiments, the routine 770 can also request or receive payment information (e.g., credit card, bank account, rewards program, etc.) associated with the consumer. In these and still other embodiments, the routine 770 can request or receive other information associated with the consumer, such as one or more vehicle identifiers (e.g., license plate numbers) associated with the consumer's vehicle(s). As described in greater detail below, the vehicle identifiers can be used to identify the consumer's vehicle(s) at one or more service stations and link fuel transactions to the consumer and/or to a pre-purchased fuel tank.

At block 772, the routine 770 determines whether the consumer is currently a member or administrator of another pre-purchased fuel tank (e.g., another personal and/or another commercial pre-purchased fuel tank) and, if so, whether the number of other pre-purchased fuel tanks exceeds a system-defined maximum. In other embodiments, the routine 770 determines whether the consumer is currently a member or administrator of (i) another personal pre-purchased fuel tank if the request received at block 771 is a request to join a personal pre-purchased fuel tank and/or (ii) another commercial pre-purchased fuel tank if the request received at block 771 is a request to join a commercial pre-purchased fuel tank.

If the routine 770 determines that the number of pre-purchased fuel tanks that the consumer is currently a member or administrator of has exceeded the maximum number allowed, the routine 770 proceeds to block 773. At block 773, the routine 770 notifies the consumer that the consumer has exceeded the number of pre-purchased fuel tanks permitted at a time (e.g., a single pre-purchased fuel tank per account, one personal pre-purchased fuel tank and one commercial pre-purchased fuel tank per account, or another number of personal and/or commercial pre-purchased fuel tanks). Thus, if the consumer is currently an administrator and/or member of one or more other pre-purchased fuel tanks and the administrator and/or member has reached the limit of pre-purchased fuel tanks permitted by the fuel pre-purchasing and sharing system, the routine 770 can notify the consumer that the limit has been reached and/or can instruct the consumer to close out a pre-purchased fuel tank (e.g., remove members from the pre-purchased fuel tank and/or empty or bring the current fuel account balance of the pre-purchased fuel tank below a threshold limit) before joining another pre-purchased fuel tank and/or to leave a pre-purchased fuel tank before joining another pre-purchased fuel tank.

If the consumer has not exceeded the allowable number of pre-purchased fuel tanks that the consumer can be associated with, the routine 770 proceeds to block 774 to determine whether a unique identifier provided in the request to join matches a pre-purchased fuel tank or invitation to join. At block 774, the routine 770 determines whether the received identifier matches a unique identifier of a pre-purchased fuel tank or an invitation to join a pre-purchased fuel tank. The routine 770 can use the identifier received at block 771 to search a database maintained by the fuel pre-purchasing and sharing system to identify a pre-purchased fuel tank the consumer wishes to join. If the routine 770 determines that the identifier provided at block 771 does not match a unique identifier of a pre-purchased fuel tank or an invitation to join a pre-purchased fuel tank, the routine 770 proceeds to block 775 to notify the consumer that the unique identifier is not valid. On the other hand, if the routine 770 determines that the identifier provided at block 771 matches a unique identifier of a pre-purchased fuel tank or an invitation to join a pre-purchased fuel tank, the routine 770 proceeds to block 776 to determine whether the corresponding pre-purchased fuel tank member limit has been reached.

At block 775, the routine 770 notifies the consumer that the identifier is invalid. For example, the routine 770 can notify the consumer that the identifier provided in the request received at block 771 is invalid and/or does not match the unique identifiers of any pre-purchased fuel tanks or invitations to join a pre-purchased fuel tank. If the identifier is invalid, the routine 770 can prompt the consumer for a valid and/or corrected identifier.

At block 776, the routine 770 determines whether a member limit of a pre-purchased fuel tank identified at block 774 has been reached. For example, the fuel pre-purchasing and sharing system can set a limit on the number of members permitted to share a pre-purchased fuel tank at the same time (e.g., 2 members, 3 members, 4 members, 5 members, 8 members, 10 members, etc.). The limit of members per personal pre-purchased fuel tank can be the same or different than the limit of members per commercial pre-purchased fuel tank. At block 776, the routine 770 compares the current number of members (including or excluding the administrator) of the pre-purchased fuel tank to the limit of members permitted. If the routine 770 determines that the current number of members of the pre-purchased fuel tank is equal to the limit of members permitted, the routine 770 proceeds to block 777 to notify the consumer that they cannot be added to the fuel tank because the member limit for that tank has been reached. In some embodiments, the routine 770 can notify the consumer that the consumer will not be able to join the pre-purchased fuel tank until a member slot of the pre-purchased fuel tank becomes available. On the other hand, if the routine 770 determines that the current number of members of the pre-purchased fuel tank is less than the limit of members permitted, the routine 770 proceeds to block 778 to prompt an administrator of the pre-purchased fuel tank for approval to add the consumer as a member of the pre-purchased fuel tank.

At block 778, the routine 770 prompts an administrator of the identified pre-purchased fuel tank for approval to add the consumer as a member of the pre-purchased fuel tank. For example, the routine 770 can notify the administrator of the pre-purchased fuel tank that the consumer has requested to join the pre-purchased fuel tank and can request the administrator to either accept or decline the consumer's request.

At block 779, the routine 770 determines whether the administrator of the pre-purchased fuel tank approved adding the consumer as a member of the pre-purchased fuel tank. If the routine 770 determines that the administrator did not approve adding the consumer as a member (e.g., the administrator did not approve the request within a specified amount of time of the request, the administrator declined the request, etc.), the routine 770 proceeds to block 780 to notify the consumer that his/her request to join the pre-purchased fuel tank was denied. On the other hand, if the routine 770 determines that the administrator approved adding the consumer as a member, the routine 770 can proceed to block 781 to add the consumer as a member of the pre-purchased fuel tank.

In some embodiments, a request to join a pre-purchased fuel tank can expire after a set amount of time. In these embodiments, if the administrator does not approve the consumer's request to join the pre-purchased fuel tank within the set amount of time, the routine 770 notifies the consumer that the request to join has expired.

At block 781, the routine 770 adds the consumer as a member of the pre-purchased fuel tank. In some embodiments, the routine 770 can add the consumer as a member of the pre-purchased fuel tank by associating the consumer's account information with the pre-purchased fuel tank. By adding the consumer as a member of the pre-purchased fuel tank, the system permits the consumer to top up and/or redeem fuel from the pre-purchased fuel tank, and/or to view and/or interact with information related to the pre-purchased fuel tank.

At block 782, the routine 770 notifies the consumer that an administrator of the pre-purchased fuel tank accepted the consumer's request to join the pre-purchased fuel tank. For example, the routine 770 can notify the consumer that he/she is now a member of the pre-purchased fuel tank.

Although the steps of the routine 770 are discussed and illustrated in a particular order, the method illustrated by the routine 770 in FIG. 7 is not so limited. In other embodiments, the method can be performed in a different order. For example, any of the steps of the routine 770 can be performed before, during, and/or after any of the other steps of the routine 770. Moreover, a person of ordinary skill in the relevant art will readily recognize that the illustrated method can be altered and still remain within some embodiments of the present technology. For example, one or more steps of the routine 770 illustrated in FIG. 7 can be omitted and/or repeated in some embodiments.

Figure 8:
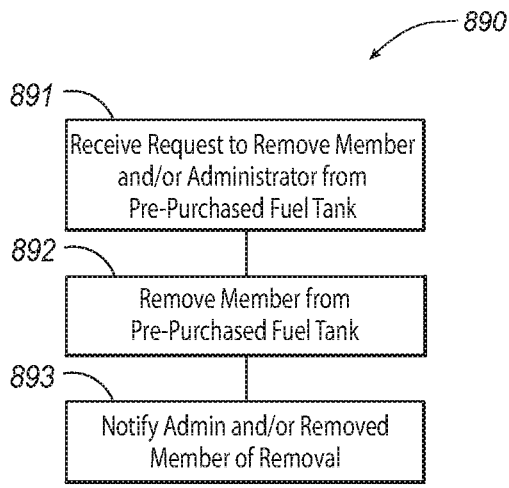
FIG. 8 is a flow diagram illustrating a routine for removing a member from a pre-purchased fuel tank.

FIG. 8 is a flow diagram illustrating a routine 890 executed by the system for removing an administrator or member from a pre-purchased fuel tank configured in accordance with various embodiments of the present technology. In some embodiments, the routine 890 can be executed, at least in part, by various components of a fuel pre-purchasing and sharing system. For example, all or a subset of one or more of the steps of the routine 890 can be carried out by the account management module, the event recording/reporting module, the business rules management module, and/or one or more other modules of the fuel pre-purchasing and sharing system.

The routine 890 begins at block 891 by receiving a request to remove a member and/or an administrator from a pre-purchased fuel tank. In some embodiments, only an administrator can request to remove a member or administrator from a pre-purchased fuel tank. In some embodiments, a member can make a request to be removed from a pre-purchased fuel tank, or the member can request to remove himself/herself from the pre-purchased fuel tank. Depending on who makes the request, the routine 890 receives the request to leave the pre-purchased fuel tank from the member and/or administrator. In some embodiments, the routine 890 can receive a request from a system operator to remove an administrator or a member (e.g., in the event the administration or member violates the terms of service of the fuel pre-purchasing and sharing system).

At block 892, the routine 890 removes the member and/or administrator from the pre-purchased fuel tank. For example, the routine 890 can disassociate the member's and/or the administrator's account from the pre-purchased fuel tank. Once removed from the fuel tank, the system prevents the member and/or administrator from accessing the pre-purchased fuel tank (e.g., by preventing the member or the administrator from topping up and/or redeeming fuel from the pre-purchased fuel tank, from interacting with information related to the pre-purchased fuel tank, etc.). In some embodiments, the routine 890 can remove an administrator from the pre-purchased fuel tank only if all other members of the pre-purchased fuel tank have been removed, another member is promoted to administrator of the pre-purchased fuel tank, there is another administrator of the pre-purchased fuel tank, and/or the current fuel balance of the pre-purchased fuel tank is below a threshold limit. In some embodiments, the routine 890 can notify the administrator and/or the member that certain criteria must be met before the member and/or the administrator can be removed from the pre-purchased fuel tank. When a member or administrator is removed from a pre-purchased fuel tank, the member or administrator is also removed from other administrator's or member's interfaces corresponding to the pre-purchased fuel tank. Additionally, upon the removal of a member or administrator, the routine 890 makes available a member slot toward the maximum number of members that can share the pre-purchased fuel tank such that another consumer can join as a member or administrator of the pre-purchased fuel tank.

At block 893, the routine 890 notifies the removed consumer and/or the administrator(s) and/or other members of the pre-purchased fuel tank that the removed consumer has been removed or has removed himself/herself from the pre-purchased fuel tank.

Although the steps of the routine 890 are discussed and illustrated in a particular order, the method illustrated by the routine 890 in FIG. 8 is not so limited. In other embodiments, the method can be performed in a different order. For example, any of the steps of the routine 890 can be performed before, during, and/or after any of the other steps of the routine 890. Moreover, a person of ordinary skill in the relevant art will readily recognize that the illustrated method can be altered and still remain within some embodiments of the present technology. For example, one or more steps of the routine 890 illustrated in FIG. 8 can be omitted and/or repeated in some embodiments.

Figure 9A:
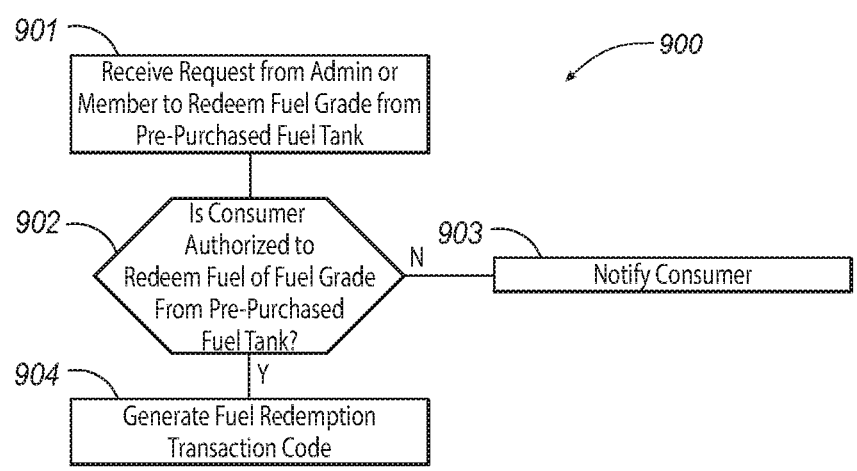
FIGS. 9A and 9B are flow diagrams illustrating a routine for redeeming fuel from a pre-purchased fuel tank.
Figure 9B:
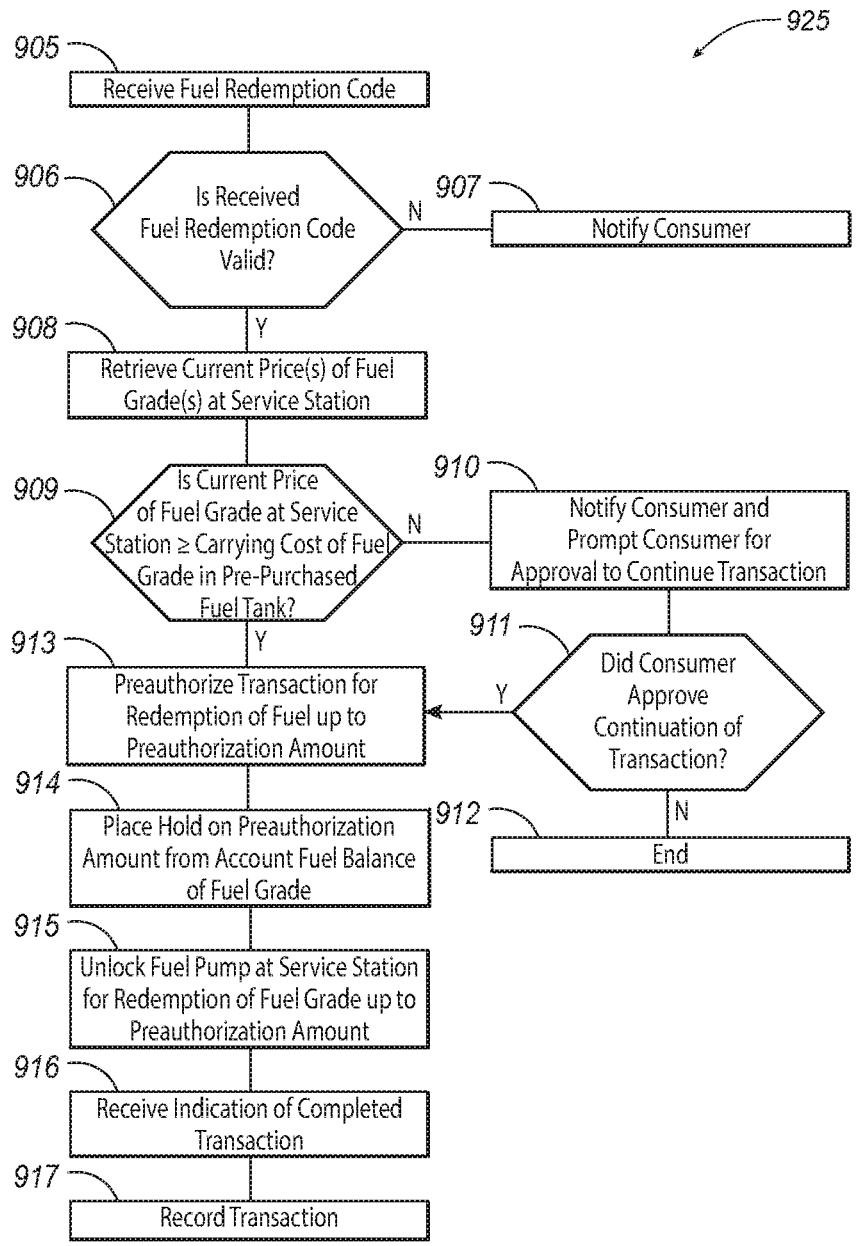

FIGS. 9A and 9B are flow diagrams illustrating routines 900 and 925 executed by the system for redeeming fuel from a pre-purchased fuel tank configured in accordance with various embodiments of the present technology. In some embodiments, the routines 900 and 925 can be executed, at least in part, by various components of a fuel pre-purchasing and sharing system. For example, all or a subset of one or more of the steps of routine 900 and 925 can be carried out by the account management module, the payment management module, the redemption management module, the event recording/reporting module, the fuel savings calculation module, the business rules management module, and/or one or more other modules of the fuel pre-purchasing and sharing system.

The routine 900 (FIG. 9A) begins at block 901 by receiving a request to redeem fuel of a fuel grade from a pre-purchased fuel tank. The request to redeem fuel is received via an interface of the fuel pre-purchasing and sharing system. For example, an administrator or member of the pre-purchased fuel tank can indicate that he/she wishes to redeem fuel of a fuel grade from the pre-purchased fuel tank via an application on his/her mobile device. As another example, the request to redeem pre-purchased fuel can be received at a point of redemption terminal, such as at a service station register or at a payment terminal incorporated into a fuel pump. As still another example, the request can be received via a website interface or via another interface of the fuel pre-purchasing and sharing system.

In some embodiments, the request to redeem fuel is triggered at a fueling station by the detection of the consumer's vehicle identifier (e.g., license plate) at a fuel pump. For example, the fuel pre-purchasing and sharing system can include one or more cameras (e.g., close-circuit television camera, video camera, or other image sensor) at one or more service stations and at least one processor in communication with the at least one camera. Video or still images from the camera or cameras can be analyzed by the system to detect images of license plates of refueling vehicles. In these embodiments, the at least one camera can capture the consumer's license plate at a service station, and the routine 900 can process the captured images to (a) recognize the license plate number in the captured image and (b) search a database of the fuel pre-purchasing and sharing system for a license plate number match. As another example, the consumer's vehicle can be connected to the internet and provide location information to the system indicating the present of the vehicle at a fueling station and/or can be configured to transmit a vehicle identifier to a point of redemption terminal to announce its presence at the terminal (e.g., via a radio frequency identifier, beacon, or other announcement hardware/method). In some embodiments, the fuel pre-purchasing and sharing system uses the vehicle identifier received from the vehicle to identify a consumer and a corresponding pre-purchased fuel tank.

In some embodiments, when a consumer registers his/her vehicle identifier(s) with the fuel pre-purchasing and sharing system and/or links the vehicle identifier(s) to the pre-purchased fuel tank, the consumer can be prompted to preapprove redemption transactions meeting one or more defined guidelines. The guidelines can include automatically requesting redemption of fuel from the pre-purchased fuel tank when the vehicle identifier(s) is/are recognized at a service station; automatically authorizing redemption of fuel when a carrying cost of fuel of a fuel grade in the pre-purchased fuel tank is less than and/or equal to the current fuel price at the service station (e.g., less than the current fuel price by greater than or equal to a threshold limit); and/or automatically authorizing redemption of fuel up to a specified amount of fuel (e.g., in litres and/or in dollars, over time, over a single transaction, etc.). Thus, in these embodiments, if the consumer has registered his/her vehicle identifier(s) with the fuel pre-purchasing and sharing system and/or has linked their vehicle identifier(s) to a pre-purchased fuel tank, the routine 900 can automatically implement the request to redeem fuel of the fuel grade when the vehicle identifier(s) is/are captured at the service station (e.g., subject to the one or more guidelines). In other embodiments, the routine 900 can send a notification to the consumer's vehicle, mobile device, and/or the point of redemption terminal to prompt the consumer for approval to redeem fuel from the pre-purchased fuel tank associated with the vehicle identifier(s).

At block 902, the routine 900 determines whether the consumer is authorized to redeem fuel of the requested fuel grade from the pre-purchased fuel tank. In some embodiments, the fuel pre-purchasing and sharing system and/or an administrator of the pre-purchased fuel tank can limit redemption of fuel from the pre-purchased fuel tank. For example, members of a pre-purchased fuel tank can be limited to redeeming an amount of fuel (e.g., in litres of fuel, in dollars of fuel, etc.) and/or an amount of fuel within a time period (e.g., within a day, within a week, within a month, within a year, etc.). In these embodiments, the routine 900 determines whether the consumer is authorized to redeem fuel of the requested fuel grade by determining whether the consumer has reached his/her redemption limit. In some embodiments, members of a pre-purchased fuel tank can be limited to (a) redeeming fuel of only particular fuel grades, (b) redeeming fuel from the pre-purchased fuel tank only when the current balance of a fuel grade in the pre-purchased fuel tank is above a threshold limit, and/or (c) redeeming fuel from the pre-purchased fuel tank only to the extent the remaining balance of the fuel grade in the pre-purchased fuel tank remains above a threshold limit after redemption (e.g., an administrator can set a threshold to ensure that other members cannot draw down a fuel tank below a minimum level). These limits can be used, for example, to prevent over-drafting of the pre-purchased fuel tank in various circumstances. In these embodiments, the routine 900 determines whether the consumer is authorized to redeem fuel of the requested fuel grade from the pre-purchased fuel tank (e.g., by comparing the current fuel balance of the requested fuel grade in the pre-purchased fuel tank to the threshold limit).

If the routine 900 determines that the consumer is not authorized to redeem fuel of the requested fuel grade from the pre-purchased fuel tank, the routine 900 proceeds to block 903 to notify the consumer that the requested redemption has been denied. For example, the routine 900 can notify the consumer that he/she has reached their redemption limit and/or that the current fuel balance of the requested fuel grade in the pre-purchased fuel tank is insufficient. In some embodiments, the routine 900 can notify the consumer that he/she is not authorized to redeem fuel of the requested fuel grade.

If the routine 900 determines that the consumer is authorized to redeem fuel of the requested fuel grade from the pre-purchased fuel tank, the routine 900 proceeds to block 904 to generate a transaction code to authorize the purchase. At block 904, the routine 900 generates a code that is used to authorize the fuel redemption transaction. The generated code can be provided by the consumer at a point of redemption terminal, such as at a cash register or at an outdoor payment terminal. For example, the routine 900 can generate a QR or other code that is provided to the consumer. In some embodiments, the code is unique to the transaction, meaning the code is only usable once for a purchase. In some embodiments, the code is unique to the pre-purchased fuel tank. For example, the code can be the unique identifier of the pre-purchased fuel tank that may be used any time the fuel tank is accessed.

After receiving the unique code, a consumer can use the code to authorize withdrawal of fuel from a pre-purchased fuel tank. At block 905, the routine 925 (FIG. 9B) receives a fuel redemption code from the consumer. In some embodiments, the routine 900 can receive the fuel redemption code when the consumer enters (e.g., via keyboard, scans, etc.) the fuel redemption code at or into a point of redemption terminal such as an outdoor payment terminal and/or another interface of the fuel pre-purchasing and sharing system. As a specific example, a code generated by the routine 900 at block 904 can be sent to the consumer's mobile device. In turn, the consumer can enter the code into a kiosk at a point of redemption terminal and/or into an outdoor payment terminal at a service station.

At block 906, the routine 925 determines whether a fuel redemption code received at block 905 is valid. For example, the routine 925 can search codes stored in a database (e.g., of codes unique to redemption transactions and/or pre-purchased fuel tanks) for a match of the fuel transaction code received by the routine 925 at block 905. If the routine 925 determines that the code received at block 905 is not valid, the routine 925 can proceed to block 907 to notify the consumer that the code is not valid. In some embodiments, the routine 925 can prompt the consumer to enter a valid and/or corrected code. On the other hand, if the routine 925 determines that the code received at block 905 is valid, the routine 925 proceeds to block 908.

At block 908, the routine 925 retrieves the current fuel prices at the service station. As discussed above, the fuel pre-purchasing and sharing system can maintain a database in which current fuel prices at one or more service stations are synchronously or asynchronously updated and stored. In these embodiments, the routine 925 can query the database for the current fuel prices at the service station. In some embodiments, the routine 925 can directly query the service station (e.g., a database corresponding to the service station) for current fuel prices at the service station. In some embodiments, the routine 925 can retrieve the current fuel price of only the requested grade of fuel, or the routine can retrieve the current fuel prices of two or more grades of fuel including the requested grade of fuel.

At block 909, the routine 925 determines whether the current price of the requested fuel grade at the service station is greater than or equal to a carrying cost of the requested fuel grade in the pre-purchased fuel tank. In some embodiments, the carrying cost is an average (e.g., mean, median, mode, weighted, etc.) cost at which fuel of the requested fuel grade in the pre-purchased fuel tank was pre-purchased. In other embodiments, the carrying cost can be the lowest, the highest, or another cost at which the fuel of requested fuel grade in the pre-purchased fuel tank was pre-purchased. In still other embodiments, the routine 925 determines whether the current price of the requested fuel grade at the service station is greater than or equal to any price at which fuel of the requested fuel grade in the pre-purchased fuel tank was pre-purchased. If the routine 925 determines that the current price of the requested fuel grade at the service station is not greater than or equal to one or more carrying costs of fuel of the requested fuel grade in the pre-purchased fuel tank, the routine 925 proceeds to block 910 to notify the consumer. Otherwise, the routine 925 proceeds to block 913 to authorize the fuel redemption transaction.

At block 910, the routine 925 notifies the consumer that the current fuel price of the requested fuel grade is cheaper than at least one carrying cost of fuel of the requested fuel grade in the pre-purchased fuel tank and can prompt the consumer for approval to continue the transaction to redeem fuel of the requested fuel grade from the pre-purchased fuel tank. For example, the routine 925 can notify the consumer on the consumer's mobile device or on an outdoor payment terminal that the current fuel price of the requested fuel grade at the service station is cheaper than at least one carrying cost of fuel of the requested fuel grade in the pre-purchased fuel tank. (By notifying the consumer, the consumer has the opportunity to decide whether to pay for the fuel using a different payment instrument, rather than using the pre-purchased fuel tank balance.) In some embodiments, the routine 925 can notify an attendant at a point of redemption terminal, and the attendant can verbally notify the consumer that the current fuel price of the requested fuel grade at the service station is cheaper than at least one carrying cost of fuel of the requested fuel grade in the pre-purchased fuel tank.

At block 911, the routine 925 determines whether the consumer elects to continue with the transaction to redeem fuel of the request fuel grade from the pre-purchased fuel tank, even though the carrying cost of the fuel in the pre-purchased fuel tank is higher than the current fuel price. For example, the consumer can approve continuing with the transaction regardless of whether the current fuel price of the requested fuel grade at the service station is cheaper than at least one carrying cost of fuel of the requested fuel grade in the pre-purchased fuel tank. In some embodiments, the consumer can preapprove automatically continuing with the transaction according to preapproved guidelines (e.g., established when the consumer registered his/her license plate).

If the routine 925 determines that the consumer did not approve continuing the transaction to redeem fuel of the requested fuel grade from the pre-purchased fuel tank, the routine 925 proceeds to block 912 to terminate the redemption transaction from the pre-purchased fuel tank. In that scenario, most consumers will proceed to authorize the transaction by charging a secondary payment means (e.g., a credit card, a mobile payment system, cash provided at the service station, etc.). On the other hand, if the routine 925 determines that the consumer approved continuing the transaction to redeem fuel of the requested fuel grade from the pre-purchased fuel tank, the routine 925 proceeds to block 913.

At block 913, the routine 925 preauthorizes the fuel redemption transaction. In some embodiments, the routine 925 preauthorizes the redemption of the requested fuel grade by any amount of fuel. In some embodiments, the routine 925 can preauthorize redemption of the requested fuel grade by the current available account fuel balance of the requested fuel grade in the pre-purchased fuel tank. In other embodiments, the fuel pre-purchasing and sharing system can preauthorize redemption of the requested fuel grade by the current available account fuel balance of the request fuel grade in the pre-purchased fuel tank less a minimum threshold balance set by an administrator or member of the pre-purchased fuel tank. In other embodiments, the fuel pre-purchasing and sharing system and/or an administrator of the pre-purchased fuel tank can set a limit of fuel (e.g., in litres and/or in dollars) per transaction. In these embodiments, the routine 925 can preauthorize the fuel redemption transaction up to the set limit of fuel per transaction. In some embodiments, the routine 925 can preauthorize the fuel redemption transaction for up to the lesser of the current available account fuel balance of the requested fuel grade in the pre-purchased fuel tank and the set limit of fuel per transaction.

At block 914, the routine 925 can place a temporary hold on the amount of fuel preauthorized from the current available account fuel balance of the fuel grade in the pre-purchased fuel tank. For example, when the current fuel balance of the requested fuel grade in the pre-purchased fuel tank is greater than or equal to a set limit of fuel per transaction and the routine 925 preauthorized the transaction at block 913 up to the set limit or up to the current available fuel balance of the requested fuel grade in the pre-purchased fuel tank, the routine 925 can place a hold on the fuel currently available from the pre-purchased fuel tank in the transaction amount that has been preauthorized. Placing a hold on certain amounts of fuel can prevent multiple withdraws on the same fuel in the pre-purchased fuel tank at the same time by multiple transactions and/or multiple consumers. In other embodiments, such as in embodiments permitting consumers to withdraw more than the current available fuel balance of the requested fuel grade in the pre-purchased fuel tank, the routine 925 can allow multiple withdraws on the same fuel in the pre-purchased fuel tank. In these embodiments, the administrator and/or member(s) of the pre-purchased fuel tank can be required to pay off (e.g., at the current fuel price at the service station or any other fuel price offered by nearby service stations) the amount of fuel withdrawn in excess above the current available fuel balance of the requested fuel grade in the pre-purchased fuel tank (e.g., using a second payment method, such as a credit card or a second redemption code). In some embodiments, the administrator and/or member(s) of the pre-purchased fuel tank can automatically pay off the excess (e.g., via automatic top ups) and/or can pay off the excess within a specified period of time.

At block 915, the routine 925 can unlock a fuel pump at the service station for redemption of fuel of the fuel grade up to the preauthorized amount. For example, the routine 925 can unlock a fuel pump at the service station into which the consumer entered one or more transaction codes, on which the transaction codes were presented to the consumer and/or at which the vehicle identifier(s) of the consumer is/are recognized. In some embodiments, an attendant at a point of redemption can unlock a fuel pump at the service station.

Alternatively, a consumer can first pump (e.g., any litre or dollar quantity of) fuel at a fuel pump and then proceed to pay for the amount of fuel received. In these scenarios, the consumer can choose to pay for all or a portion of the amount of fuel pumped using a redemption code to draw from the current fuel balance of the corresponding fuel type in the consumer's pre-purchased fuel tank. Additionally, or alternatively, the consumer can choose to pay for all or a portion of the amount of fuel pumped using a second payment method, such as a credit card or a second, separate transaction code.

At block 916, the routine 925 receives an indication that the redemption transaction is complete. In some embodiments, the indication can include an amount of fuel (e.g., in litres, in total dollars or transaction amount, etc.) the consumer redeemed at the service station. In some embodiments, the indication can include other information of the completed transaction, such as the address of the service station, the current fuel price of the redeemed fuel grade at the service station, the date and time of the transaction, payment method(s) used, rewards points or other credits awarded towards a rewards program, and/or other information.

At block 917, the routine 925 records the completed transaction. The routine 925 decreases the balance of the pre-purchased fuel tank by the amount of fuel actually redeemed, and releases any amounts that were previously held in excess of the fuel actually redeemed. The routine 925 can also record the amount of fuel redeemed from the pre-purchased fuel tank, the transaction amount (e.g., monetary value), one or more carrying costs of the fuel redeemed, the current fuel price of the redeemed fuel grade at the service station, the name of the service station, the address of the service station, any bonus litres or other rewards earned, the date of the transaction, the time of the transaction, information regarding the payment account charged, information regarding the redemption request, and/or the name and/or other information of the consumer.

In some embodiments, the routine 925 can calculate and record an amount saved by each transaction. For example, the routine 925 can calculate an amount saved by (a) determining the difference between a carrying cost of the fuel redeemed and the current fuel price of the redeemed fuel grade at the service station and (b) multiplying the difference by the amount (e.g., litres) of fuel redeemed at the service station. In embodiments using multiple carrying costs rather than an average or other single carrying cost, the savings can be calculated on a first pre-purchased, first redeemed basis. In some embodiments, the savings can be calculated on a lowest-to-highest carrying cost basis, a highest-to-lowest carrying cost basis, or some other sequence of carrying cost basis. The routine 925 records transaction details in one or more data tables, as discussed in greater detail below with respect to FIG. 10. The consumer and/or an administrator and/or another member of the pre-purchased fuel tank can (e.g., subsequently) review details of the recorded transaction.

Although the steps of the routines 900 and 925 are discussed and illustrated in a particular order, the methods illustrated by the routines 900 and 925 in FIGS. 9A and 9B, respectively, are not so limited. In other embodiments, the methods can be performed in a different order. For example, any of the steps of the routines 900 and/or 925 can be performed before, during, and/or after any of the other steps of the routines 900 and/or 925. Moreover, a person of ordinary skill in the relevant art will readily recognize that the illustrated methods can be altered and still remain within some embodiments of the present technology. For example, one or more steps of the routines 900 and/or 925 illustrated in FIGS. 9A and 9B, respectively, can be omitted and/or repeated in some embodiments. In some embodiments, if the routines 900 and/or 925 loses connectivity or communication with the consumer and/or with one or more components of the fuel pre-purchasing and sharing system, the routines 900 and/or 925 can continue if the routines 900 and/or 925 received approval from the consumer at block 911 to continue a transaction and/or preauthorized a transaction at block 913 before connectivity was lost. Otherwise, the routines 900 and/or 925 can terminate early, and/or the consumer can be notified that redemption of fuel from the pre-purchased fuel tank is currently not available.

Figure 10:
FIG. 10 is a data table that is used to record transaction information associated with one or more purchase (top up) or redemption transactions corresponding to a pre-purchased fuel tank.

FIG. 10 illustrates an example of a data table 1000 that contains transaction information associated with one or more top up or redemption transactions corresponding to a pre-purchased fuel tank. Each row in the table 1000 reflects a single transaction. Each column contains data characterizing or associated with a transaction. As discussed above, the fuel pre-purchasing and sharing system can update the table 1000 with transaction data continuously, periodically, or sporadically. Transaction data is generated each time an administrator and/or a member of a pre-purchased fuel tank tops up the pre-purchased fuel tank or redeems fuel from the pre-purchased fuel tank. The particular pre-purchased fuel tank associated with the data table 1000 can contain multiple different grades of fuel, although it will be appreciated that other fuel tanks may only have a single grade of fuel associated with each tank.

The table 1000 includes a consumer ID column 1001 that is used to record an administrator or member identifier associated with a transaction. For example, a name of an administrator or member (e.g., "Allie") can be recorded in the consumer ID column 1001 when the administrator or member pre-purchases or redeems fuel. In other embodiments, a different identifier (e.g., an identifier unique to the administrator or member) can be recorded in the consumer ID column 1001 in addition to or in lieu of the administrator's or member's name.

The table 1000 also includes a transaction type column 1002 that records whether a transaction corresponds to a pre-purchase transaction or a redemption transaction. As shown in FIG. 10, Allie and Diane purchased fuel to top up the pre-purchased fuel tank, which is represented by the code "P" recorded in the transaction type column 1002. In contrast, Andrew redeemed fuel from the pre-purchased fuel tank, which is represented by the code "R" in the transaction type column 1002.

The table 1000 includes a date column 1003 and a time column 1004 in which the data and time for each transaction is recorded. As shown, the transactions in the table 1000 are ordered chronologically by date and time. In other embodiments, transactions recorded in the table can be ordered according to other indices, such as by consumer ID and/or fuel grade.

The table 1000 includes a vender or brand column 1005 and a location column 1006. In some embodiments, for pre-purchase transactions, the vendor/brand and/or location of a service station offering the lowest current price of fuel that is presented to a consumer and at which the consumer pre-purchases fuel can be recorded in the vendor/brand column 1005 and/or the location column 1006, respectively. Alternatively, one or both of these columns can be left blank for pre-purchase transactions, and/or the current location of the consumer can be recorded in the location column 1006. For redemption transactions, the vendor/brand and location of the service station at which a consumer redeems fuel can be recorded in the vendor/brand column 1005 and the location column 1006, respectively. Although locations recorded in the location column 1006 in the table 1000 are recorded as decimal degree coordinates, the locations can be recorded in other units. For example, the locations can be recorded in degrees, minutes, seconds coordinates and/or the locations can be recorded as postal addresses.

The table 1000 also includes a fuel grade column 1007, an amount of fuel column 1008, and a price per litre column 1009. A grade of fuel pre-purchased and/or redeemed is recorded in the fuel grade column 1007, and an amount of fuel (in litres) pre-purchased or redeemed is recorded in the amount of fuel column 1008. For pre-purchase transactions, the price per litre presented to the consumer and at which the amount of fuel is pre-purchased is recorded in the price per litre column 1009. For redemption transactions, the current price per litre of the fuel grade at the service station at which the fuel was redeemed and/or a carrying cost per litre of the fuel redeemed from the pre-purchased fuel tank is recorded in the price per litre column 1009.

As shown in the table 1000, Allie pre-purchased 26 litres of diesel grade (ZD) fuel at $1.65 per litre, and Diane pre-purchased 150 litres of petrol/gasoline with a 95 octane rating (ZX95) at $2.21 per litre. Thus, the transaction amount of Allie's pre-purchase transaction was $42.90 and the transaction amount of Diane's pre-purchase transaction was $331.50. These transaction amount values are recorded in the transaction amount column 1010 of the table 1000. As discussed in greater detail below, Diane was rewarded 15 bonus litres of ZX95 petrol/gasoline fuel for her bulk purchase. As such, the carrying cost per litre of the ZX95 petrol/gasoline fuel credited to the pre-purchased fuel tank from Diane's purchase is $2.01 per litre ($331.50/165 litres). The $2.01 carrying cost can be recorded in the carrying cost per litre column 1013 of the table 1000.

In contrast, Andrew redeemed 24.7 litres of petrol/gasoline with a 95 octane rating (ZX95). The current price per litre of ZX95 petrol/gasoline at the service station was $2.42, which can be recorded in the price per litre column 1009 of the table 1000. Had Andrew needed to pay the current price per litre of fuel at the service station, the transaction amount of Andrew's redemption transaction would have been $59.78. This transaction amount can be recorded in the transaction amount column 1010 of the table 1000. Because Diane pre-purchased 150 litres of ZX95 petrol/gasoline fuel at $2.21 per litre with a carrying cost of $2.01 per litre, however, Andrew was able to redeem 24.7 litres of fuel at $2.01 per litre, meaning that the transaction amount of Andrew's redemption transaction was $49.65. The $2.01 carrying cost per litre and/or the $49.65 transaction amount can be recorded in the price per litre column 1009 and/or the transaction amount column 1010, respectively, in addition to or in lieu of the $2.42 price per litre and/or the $59.78 transaction amount. As discussed in greater detail below, the $10.13 savings (e.g., the difference between the transaction amounts at the current price per litre and at the carrying cost per litre) can be recorded in a savings column 1014 of the table 1000.

The table 1000 also includes a payment method column 1011. Information related to the method of payment used to pre-purchase and/or redeem fuel can be stored in the payment method column 1011. As shown in FIG. 10, Allie used Fly Buys airline miles/rewards points to pre-purchase the 26 litres of ZD diesel fuel, whereas Diane used a credit card to pre-purchase the 150 litres of ZX95 petrol/gasoline. To redeem the 24.7 litres of ZX95 petrol/gasoline, Andrew used a redemption code generated by the fuel pre-purchase and sharing system, which is recorded in the payment method column 1011.

In some embodiments, the table 1000 includes a bonus litres column 1012. For example, a system operator of the fuel pre-purchasing and sharing system can award bonus litres of fuel for certain pre-purchase and redemption transactions. For pre-purchase transactions, the amount of bonus litres awarded can be directly correlated with the amount of fuel pre-purchased and/or the transaction amount. As shown in the table 1000, Diane was rewarded 15 litres of fuel for her bulk pre-purchase of ZX95 petrol/gasoline.

The table 1000 includes a carrying cost per litre column 1013. The initial the price per litre at which fuel was pre-purchased can be recorded in the carrying cost per litre column 1013. For example, Allie purchased 26 litres of ZD diesel fuel at $1.65 per litre, so the carrying cost per litre of the 26 litres of ZD diesel fuel stored in the pre-purchased fuel tanks is $1.65. In some embodiments, as additional fuel is purchased at different prices, the carrying cost is adjusted. The carrying cost can also be adjusted if bonus fuel is awarded to the consumer. For example, Diane purchased 150 litres of ZX95 petrol/gasoline fuel at $2.21 per litre and was rewarded 15 bonus litres for her bulk purchase. The 15 bonus litres reduces the carrying cost per litre of the ZX95 petrol/gasoline fuel purchased by Diane from $2.21 per litre to $2.01 per litre. The $2.01 per litre carrying cost is recorded in the carrying cost per litre column 1013.

The transaction data table 1000 also includes a savings column 1014. Various savings achieved by a consumer and calculated by the fuel pre-purchase and sharing system can be recorded in the savings column 1014. As discussed above, for example, Andrew saved $10.13 by redeeming fuel pre-purchased by Diane at $2.01 rather than paying the current price per litre of fuel (e.g., $2.42 per litre) at the service station. This savings is recorded in the savings column 1014.

Other savings for pre-purchase transactions in addition to or in lieu of the redemption transaction savings can be recorded in the savings column 1014. In some embodiments, savings achieved by purchasing fuel at the lowest price of fuel presented to a consumer can be recorded in the savings column 1014. For example, Allie purchased 26 litres of ZD diesel fuel at $1.65 per litre, which was the lowest price of fuel offered by service stations within a set distance from Allie's location at the time of the pre-purchase. If the average price per litre of fuel offered by the service stations located within the set distance from Allie's location at the time of the pre-purchase was $1.68 per litre of fuel, then a savings of $0.78 can be recorded in the savings column 1014 of the table 1000.

The table 1000 can include a fuel balance column 1015. The current balance of fuel at a given date and time can be recorded in the fuel balance column 1015. For example, Allie topped off ZD diesel fuel in the pre-purchased fuel tank by 26 litres, and Diane topped off ZX95 petrol/gasoline in the pre-purchased fuel tank by 150 litres. The previous balance of ZD diesel fuel in the tank was zero litres, so the fuel balance recorded in the fuel balance column 1015 is 26 litres of ZD diesel fuel, which represents the current balance of ZD diesel fuel in the pre-purchased fuel tank after Allie's pre-purchase transaction. Similarly, the balance of ZX95 petrol/gasoline fuel in the pre-purchased fuel tank was zero litres prior to Diane's pre-purchase transaction. Diane was rewarded 15 bonus litres, however, so the fuel balance recorded in the fuel balance column 1015 of the table 1000 is 165 litres of ZX95 petrol/gasoline fuel as opposed to 150 litres of ZX95 petrol/gasoline fuel. Andrew redeemed a total of 24.7 litres of ZX95 petrol/gasoline fuel after Diane's pre-purchase transaction, so the fuel balance recorded in the fuel balance column 1015 of the table 1000 is 140.3 litres of ZX95 petrol/gasoline fuel (e.g., 165 litres less 24.7 litres).

The table 1000 can include other columns and/or transaction data than shown in FIG. 10. For example, the table 1000 can include a vehicle identifier column and/or a pump number column in which vehicles identifiers identified at a service station and the pump number at which fuel was redeemed, respectively, are recorded. Additionally, or alternatively, the table 1000 can include a rewards column in which points or other currency associated with a rewards program and awarded or earned via a transaction are recorded. Furthermore, although transaction data for only a single pre-purchased fuel tank are shown in the table 1000, the table 1000 in other embodiments can include transaction data corresponding to two or more pre-purchased fuel tanks. In these embodiments, the table 1000 can include one or more additional columns. For example, the table 1000 in these embodiments can include a tank ID column in which a unique identifier of a pre-purchased fuel tank associated with a transaction is recorded. In some embodiments, the table 1000 can be broken into two or more tables. For example, top up transaction data can be recorded and stored in a different data table than redemption transaction data.

CONCLUSION

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented and/or discussed in a given order, alternative embodiments can perform steps in a different order. Furthermore, the various embodiments described herein can also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms can also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Where the context permits, singular or plural terms can also include the plural or singular term, respectively. Additionally, the terms "comprising," "including," "having" and "with" are used throughout to mean including at least the recited feature(s) such that any greater number of the same feature and/or additional types of other features are not precluded. As used herein, the phrase "and/or" as in "A and/or B" refers to A alone, B alone, and both A and B.

From the foregoing, it will also be appreciated that various modifications can be made without deviating from the technology. For example, various components of the technology can be further divided into subcomponents, or that various components and functions of the technology can be combined and/or integrated. Furthermore, although advantages associated with certain embodiments of the technology have been described in the context of those embodiments, other embodiments can also exhibit such advantages, and not all embodiments need necessarily exhibit such advantages to fall within the scope of the technology. Accordingly, the disclosure and associated technology can encompass other embodiments not expressly shown or described herein.

We claim:

1. A computer-implemented method of managing access to a pre-purchased fuel tank, the method comprising:
    storing, in a computing system, a balance of a fuel grade in the pre-purchased fuel tank, wherein the pre-purchased fuel tank is associated with a first account of a first consumer, and wherein the balance represents a first amount of fuel of the fuel grade the first consumer can redeem at a service station regardless of a current fuel price of the fuel grade at the service station;
    receiving an electronic request to join the pre-purchased fuel tank from a second consumer different than the first consumer; and
    adding the second consumer as a member of the pre-purchased fuel tank, wherein adding the second consumer as a member of the pre-purchased fuel tank includes associating a second account of the second consumer with the pre-purchased fuel tank such that both the first consumer and the second consumer can redeem amounts of fuel of the fuel grade from the balance at the service station without being charged the current fuel price of the fuel grade at the service station.

2. The method of claim 1, further comprising limiting the second consumer from inviting a third consumer different from the first and second consumers to join the pre-purchased fuel tank.

3. The method of claim 1, further comprising:
    receiving an electronic request to invite the second consumer to join the pre-purchased fuel tank; and
    in response to the electronic request to invite the second consumer to join the pre-purchased fuel tank, populating an invitation with a unique identifier of the pre-purchased fuel tank.

4. The method of claim 3, further comprising:
    setting a limit on a number of members that can be associated with the pre-purchased fuel tank; and
    in response to receiving the electronic request to invite, determining whether a current number of members associated with the pre-purchased fuel tank is less than the limit on the number of members.

5. The method of claim 4, wherein setting the limit includes:
    identifying that the pre-purchased fuel tank is a personal pre-purchased fuel tank; and
    setting a first limit on the number of members, wherein the first limit is different from a second limit on the number of members that is set when the pre-purchased fuel tank is a commercial pre-purchased fuel tank.

6. The method of claim 1, further comprising prompting the first consumer for approval to add the second consumer as a member of the pre-purchased fuel tank, wherein adding the second consumer as a member of the pre-purchased fuel tank includes adding the second consumer as a member only after receiving approval from the first consumer to add the second consumer as a member of the pre-purchased fuel tank.

7. The method of claim 1, wherein:
    the electronic request to join the pre-purchased fuel tank includes an identifier;
    the method further comprises determining whether the identifier matches a unique identifier of the pre-purchased fuel tank;

adding the second consumer as a member of the pre-purchased fuel tank includes adding the second consumer as a member of the pre-purchased fuel tank only when the identifier matches the unique identifier of the pre-purchased fuel tank.

8. The method of claim 1, further comprising:
receiving an electronic request to add to the balance of the fuel grade in the pre-purchased fuel tank from the first consumer or the second consumer;
in response to the electronic request to add to the balance, searching for one or more service stations within a radius of a current location of the first consumer or of a current location of the second consumer;
retrieving current fuel prices of the fuel grade offered by the one or more service stations;
determining a minimum current fuel price of the retrieved current fuel prices;
presenting the minimum current fuel price to the first consumer or to the second consumer;
receiving an electronic request to pre-purchase a requested amount of fuel of the fuel grade at the minimum current fuel price from the first consumer or from the second consumer;
charging the first account of the first consumer or the second account of the second consumer by an amount equivalent to a product of the requested amount of fuel and the minimum current fuel price; and
increasing the balance of the fuel grade in the pre-purchased fuel tank by the requested amount of fuel.

9. The method of claim 1, further comprising:
receiving an electronic request to redeem fuel of the fuel grade from the pre-purchased fuel tank from the first consumer or from the second consumer;
determining whether the first consumer or the second consumer is authorized to redeem fuel of the fuel grade from the pre-purchased fuel tank;
unlocking a fuel pump at the service station such that the first consumer or the second consumer can redeem fuel from the fuel pump without having to pay a current price of fuel of the fuel grade at the service station;
receiving an electronic indication that the first consumer or the second consumer has redeemed an amount of fuel of the fuel grade from the fuel pump at the service station; and
decreasing the balance of the fuel grade in the pre-purchased fuel tank by an amount up to the amount of redeemed fuel.

10. The method of claim 1, further comprising determining whether the second account of the second consumer is currently associated with another pre-purchased fuel tank, and wherein adding the second consumer as a member of the pre-purchased fuel tank includes adding the second consumer as a member of the pre-purchased fuel tank only when the second account of the second consumer is not associated with another pre-purchased fuel tank.

11. The method of claim 1, further comprising:
receiving an electronic request from the first consumer to set up the pre-purchased fuel tank;
determining whether the first account of the first consumer is currently associated with another pre-purchased fuel tank; and
setting up the pre-purchased fuel tank by associating the first account of the first consumer with the pre-purchased fuel tank only when the first account of the first consumer is not associated with another pre-purchased fuel tank.

12. The method of claim 1, wherein adding the second consumer as a member of the pre-purchased fuel tanks includes associating the second account of the second consumer with the pre-purchased fuel tank such that the second consumer can redeem a second amount of fuel of the fuel grade from the balance at the service station without being charged the current fuel price of the fuel grade at the service station, and wherein the second amount of fuel is less than the first amount of fuel.

13. The method of claim 1, further comprising:
after adding the second consumer as a member of the pre-purchased fuel tank, receiving a second electronic request to join the pre-purchased fuel tank from a third consumer different from the first and second consumers; and
adding the third consumer as a member of the pre-purchased fuel tank, wherein adding the third consumer as a member of the pre-purchased fuel tank includes associating a third account of the third consumer with the pre-purchased fuel tank such that each of the first consumer, the second consumer, and the third consumer can redeem the amounts of fuel of the fuel grade from the balance at the service station without being charged the current fuel price of the fuel grade at the service station.

14. The method of claim 1, further comprising:
after adding the second consumer as a member of the pre-purchased fuel tank, receiving an electronic request from the second consumer to invite a third consumer to join the pre-purchased fuel tank, wherein the third consumer is different from the first and second consumers; and
in response to the request to invite the third consumer to join the pre-purchased fuel tank, sending an electronic invitation to the third consumer to join the pre-purchased fuel tank.

15. The method of claim 1, further comprising:
before receiving the electronic request to join the pre-purchased fuel tank, receiving an electronic request to invite the second consumer to join the pre-purchased fuel tank;
in response to receiving the electronic request to invite the second consumer, populating an electronic invitation with a first identifier unique to the invitation;
transmitting the electronic invitation to the second consumer; and
determining whether a second identifier included in the electronic request to join the pre-purchased fuel tank matches the first identifier,
wherein adding the second consumer as a member of the pre-purchased fuel tank includes adding the second consumer as a member of the pre-purchased fuel tank only when the second identifier matches the first identifier.

16. The method of claim 1, further comprising:
receiving an electronic request to invite the second consumer to join the pre-purchased fuel tank;
in response to receiving the electronic request to invite the second consumer, determining whether a second geographic region in which the second consumer is registered matches a first geographic region in which the first consumer is registered; and
sending an electronic invitation to the second consumer to join the pre-purchased fuel tank only when the second geographic region matches the first geographic region.

17. The method of claim 1, wherein adding the second consumer as a member of the pre-purchased fuel tank includes associating an identifier of a vehicle of the second consumer with the pre-purchased fuel tank.

18. The method of claim 17, wherein the identifier of the vehicle includes a license plate number of the vehicle.

19. The method of claim 17, wherein:
adding the second consumer as a member of the pre-purchased fuel tank includes preapproving redemption transactions that meet one or more guidelines;
the one or more guidelines include (i) automatically requesting redemption of fuel from the pre-purchased fuel tank when the identifier of the vehicle is recognized at a service station, (ii) automatically authorizing redemption of the fuel when a carrying cost of the fuel in the pre-purchased fuel tank is less than or equal to a current price of the fuel at the service station, and/or (iii) automatically authorizing redemption of the fuel up to a predefined amount.

20. The method of claim 1, further comprising, before adding the second consumer as a member of the pre-purchased fuel tank, instructing the second consumer to (i) leave a second pre-purchased fuel tank, (ii) remove members from the second pre-purchased fuel tank, and/or (iii) empty the second pre-purchased fuel tank or bring a fuel account balance of the second pre-purchased fuel tank below a threshold limit.

21. The method of claim 1, wherein:
adding the second consumer as a member of the pre-purchased fuel tank includes setting one or more redemption limits for the second consumer; and
the one or more redemption limits include:
a first limit specifying a second amount of fuel the second consumer is permitted to redeem from the pre-purchased fuel tank,
a second limit specifying a third amount of the fuel the second consumer is permitted to redeem from the pre-purchased fuel tank within a period of time,
a third limit specifying one or more fuel grades the second consumer is permitted to redeem from the pre-purchased fuel tank,
a fourth limit restricting redemption of the fuel by the second consumer to only when a current balance of the fuel in the pre-purchased fuel tank is above a first threshold limit, and/or
a fifth limit specifying a fourth amount of the fuel the second consumer is permitted to redeem from the pre-purchased fuel tank, wherein the fourth amount of the fuel is limited to a current balance of the fuel less a second threshold limit.

* * * * *